(12) United States Patent
Matsubara et al.

(10) Patent No.: US 7,922,618 B2
(45) Date of Patent: Apr. 12, 2011

(54) VEHICULAR ENGINE CONTROL APPARATUS

(75) Inventors: Tooru Matsubara, Toyota (JP); Kenta Kumazaki, Toyota (JP); Atsushi Tabata, Okazaki (JP); Masakazu Kaifuku, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 478 days.

(21) Appl. No.: 12/222,297

(22) Filed: Aug. 6, 2008

(65) Prior Publication Data

US 2009/0055073 A1  Feb. 26, 2009

(30) Foreign Application Priority Data

Aug. 21, 2007  (JP) .................................. 2007-215243

(51) Int. Cl.
*B60K 1/02* (2006.01)
*B60W 10/04* (2006.01)

(52) U.S. Cl. ............................................ 477/3; 477/107

(58) Field of Classification Search .................... None
See application file for complete search history.

(56) References Cited

U.S. PATENT DOCUMENTS

| 7,134,984 B2 * | 11/2006 | Takada et al. ................. 477/110 |
| 7,771,310 B2 * | 8/2010 | Tanishima ........................ 477/5 |
| 2009/0017984 A1 * | 1/2009 | Shibata et al. ..................... 477/3 |
| 2010/0203996 A1 * | 8/2010 | Kawai et al. ...................... 475/5 |
| 2010/0204005 A1 * | 8/2010 | Kaltenbach ....................... 477/5 |

FOREIGN PATENT DOCUMENTS

| JP | A-2004-208417 | 7/2004 |
| JP | A-2005-240918 | 9/2005 |

* cited by examiner

*Primary Examiner* — Dirk Wright
(74) *Attorney, Agent, or Firm* — Oliff & Berridge, PLC

(57) ABSTRACT

An engine control apparatus for a vehicle provided with a drive system including an engine and a transmission portion which constitutes a part of a power transmitting path, the engine control including an engine control portion configured to change a timing of initiation or a method of a control of the engine according to contents of a requirement for implementing the control of the engine, when the control of the engine and a shifting control of said transmission portion are concurrently required to be implemented.

35 Claims, 12 Drawing Sheets

| | C1 | C2 | B1 | B2 | B3 | SPEED RATIO | STEPPING RATIO |
|---|---|---|---|---|---|---|---|
| 1st | O | | | | O | 3.357 | 1.54 |
| 2nd | O | | | O | | 2.180 | 1.53 |
| 3rd | O | | O | | | 1.424 | 1.42 |
| 4th | O | O | | | | 1.000 | SPREAD 3.36 |
| R | | O | | | O | 3.209 | |
| N | | | | | | | |

O ENGAGED

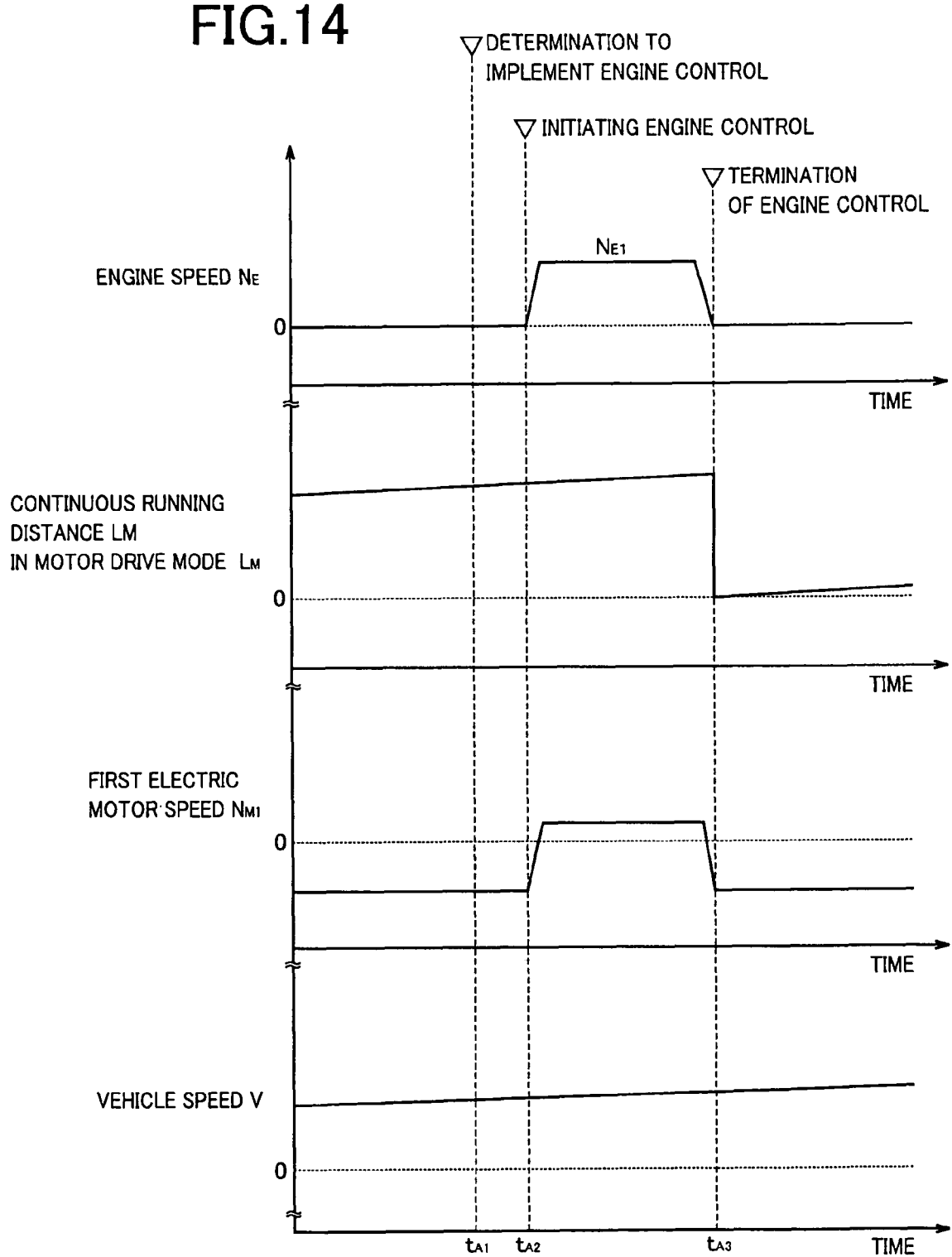

VEHICULAR ENGINE CONTROL APPARATUS

CROSS REFERENCE TO RELATED APPLICATION

The present application claims priority from Japanese Patent Application No. 2007-215243, which was filed on Aug. 21, 2007, the disclosure of which is herein incorporated by reference in its entirety.

BACKGROUND OF THE INVENTION

1. Field of the Invention

The present invention relates in general to a vehicular engine control apparatus, and more particularly to techniques for adjusting the order of implementation of a shifting control of a transmission portion and a control of an engine which would otherwise take place concurrently.

2. Discussion of Prior Art

There is known a hybrid vehicle provided with a plurality of drive power sources. JP-2004-208417A and JP-2005-240918A disclose a such a hybrid vehicle provided with a drive system, which includes a first drive power source in the form of an internal combustion engine and a second drive power source in the form of an electric motor, and which has a drive mode in which the hybrid vehicle is driven with at least the engine held at rest, and a drive mode in which the hybrid vehicle is driven with an operation of the engine. Upon switching the vehicle drive mode between these two drive modes, the engine is controlled to be started or stopped.

The hybrid vehicle as described above may be provided with a transmission which constitutes a part of a power transmitting path. When a control of a shifting action of the transmission (hereinafter referred to as "shifting control") and a control of the engine (hereinafter referred to as "engine control") overlap each other or take place concurrently, the shifting control must be implemented according to a change of a vehicle drive force due to the engine control, and therefore tends to be unfavorably complicated.

In view of the above-indicated problem, JP-2004-208417A discloses a technique for initiating the shifting control only after substantial completion of starting of the engine, when the shifting control for a power-on shift-down action of the transmission, for example, and the engine control to start the engine are concurrently required to be implemented.

The technique of inhibiting concurrent implementation of the shifting control and the engine control as disclosed in JP-2004-208417A makes it possible to prevent a shifting shock caused by a variation of a vehicle drive torque due to the shifting control, and a variation of the vehicle drive torque due to the engine control, which variations would otherwise take place concurrently.

The inhibition of the concurrent shifting control and engine control, by initiating the engine control to start the engine only after the completion of the shifting action of the transmission, for example, causes a delayed output of the engine, upon the above-indicated power-on shift-down action taking place as a result of an increase of a vehicle operator's desired vehicle output torque, for instance, which causes starting of the engine. The delayed starting of the engine and an accordingly delayed rise of the vehicle drive force give rise to a risk of deterioration of drivability or acceleration performance of the vehicle as felt by the vehicle operator.

On the other hand, the concurrent shifting control and engine control to improve the acceleration performance of the vehicle gives rise to a risk of complexity of the engine control and deterioration of a starting shock of the engine and the above-indicated shifting shock of the transmission, in a partially or imperfectly shifted state or a neutral state of the transmission in which a vehicle drive force cannot be transmitted through the transmission. In a hybrid vehicle provided with the drive system as disclosed in JP-2005-240918A, for example, the engine control is implemented to start the engine by motoring (cranking) with a first electric motor, and to permit a second electric motor to produce a reaction torque. In the partially shifted or neutral state of the transmission in which a ring gear of the transmission connected to the second electric motor has a small torque or does not have a torque, it is difficult to establish a torque balance of the rotary elements of the transmission in the process of the engine control, resulting in a possibility of deterioration of shocks as a result of the engine control and the shifting control.

SUMMARY OF THE INVENTION

The present invention was made in view of the background art described above. It is therefore an object of this invention to provide an engine control apparatus for a vehicle provided with an engine, and a power transmitting device including a transmission, which engine control apparatus enables the engine to be controlled according to an intention of a vehicle operator, when a shifting control of the transmission and a control of the engine are concurrently required to be implemented.

The object indicated above can be achieved according to any one of the following modes of this invention, each of which is numbered like the appended claims and which depends from the other mode or modes, where appropriate, for easier understanding of technical features disclosed in the present application, and combinations of those features.

(1) An engine control apparatus for a vehicle provided with an engine, and a power transmitting system including a transmission portion which constitutes a part of a power transmitting path, the engine control apparatus comprising an engine control portion configured to change a timing of initiation of a control of the engine according to contents of a requirement for implementing the control of the engine, when the control of the engine and a shifting control of the transmission portion are concurrently required to be implemented.

In the engine control apparatus of the above-described mode (1) according to a first aspect of the present invention, the timing of initiation of the control of the engine is changed according to the contents of the requirement for implementing the control of the engine, when the control of the engine and the shifting control of the transmission portion are concurrently required to be implemented. Accordingly, the control of the engine is initiated at the timing according to the contents of the requirement for the engine control that are based on the intention of an operator of the vehicle. Accordingly, the present engine control apparatus simplifies the shifting control and the engine control while assuring both an improved response to the intention of the vehicle operator and reduction of a shifting shock of the transmission portion.

(2) The engine control apparatus according to the above-described mode (1), wherein the requirement for implementing the control of the engine is a requirement for implementing a starting control of the engine, and the contents of the requirement include presence or absence of a requirement for a change of a drive force to drive the vehicle, the engine control portion implements the starting control of the engine in the process of the shifting control of the transmission portion when the requirement for the change of the drive force is present, and initiates one of the starting control of the engine and the shifting control after completion of the other of the starting control and the shifting control, when the requirement for the change of the drive force is absent.

In the above-described mode (2) of the invention, the starting control of the engine is implemented in the process of the shifting control of the transmission portion when the requirement for a change of the vehicle drive force is present, but one of the engine starting control and the shifting control is initiated after completion of the other control when the requirement for the change of the vehicle drive force is absent. This arrangement permits not only an improved response to the vehicle operator's desire to change the vehicle drive force, but also reduction of the shifting shock or the engine starting shock when the vehicle operator does not desire to change the vehicle drive force. Thus, the present engine control apparatus simplifies the shifting control and the engine starting control while assuring both an improvement of the response to the intention of the vehicle operator and reduction of the shifting shock of the transmission portion.

(3) The engine control apparatus according to the above-described mode (2), wherein the engine control portion implements one of the shifting control and the engine starting control the implementation of which is determined prior to the other, such that the above-indicated one of the shifting and engine starting controls is implemented prior to the other, when the requirement for the change of the drive force is absent.

In the above-described mode (3) of this invention, one of the shifting and engine starting controls the implementation of which is determined prior to the other is implemented prior to the other when the requirement for the change of the vehicle drive force is absent. Accordingly, one of the shifting control and the engine starting controls is not concurrently implemented during the other control, making it possible to prevent deterioration of the shifting or engine starting shock.

(4) The control apparatus according to the above-described mode (1), wherein the drive system further includes an electric motor operatively connected to a drive wheel of the vehicle, and the engine control portion is configured to implement the control to rotate an output shaft of the engine when a continuous running distance of the vehicle in a motor drive mode in which the vehicle runs with the electric motor while the engine is held at rest has exceeded a predetermined upper limit, and wherein the engine control portion initiates one of the control of the engine to rotate its output shaft when the continuous running distance has exceeded the upper limit and the shifting control after completion of the other of the control of the engine and the shifting control, when the above-indicated control of the engine to rotate its output shaft and the shifting control are concurrently required to be implemented.

In the above-described mode (4) of the invention, the control of the engine to rotate its output shaft is implemented when the distance of continuous running of the vehicle with the electric motor operatively connected to the vehicle drive wheel while the engine is held at rest has exceeded the upper limit. One of the control of the engine to rotate its output shaft when the continuous running distance has exceeded the upper limit and the shifting control of the transmission portion is initiated after completion of the other of the engine control and the shifting control, where these two controls are concurrently required to be implemented. Accordingly, one of the engine control to rotate the engine output shaft and the shifting control is not implemented in the process of the other of the engine control and shifting control, making it possible to prevent deterioration of the shifting shock and the shock due to the engine control.

(5) The control apparatus according to the above-described mode (1), wherein the drive system further includes an electric motor operatively connected to a drive wheel of the vehicle, and the engine control portion is configured to implement the control to rotate an output shaft of the engine when a continuous running time of the vehicle in a motor drive mode in which the vehicle runs with the electric motor while the engine is held at rest has exceeded a predetermined upper limit, and wherein the engine control portion initiates one of the control of the engine to rotate its output shaft when the continuous running time has exceeded the upper limit and the shifting control after completion of the other of the control of the engine and the shifting control, when the above-indicated control of the engine to rotate its output shaft and the shifting control are concurrently required to be implemented.

In the above-described mode (5) of the present invention, the control of the engine to rotate its output shaft is implemented when the time of continuous running of the vehicle with the electric motor operatively connected to the vehicle drive wheel while the engine is held at rest has exceeded the upper limit. One of the control of the engine to rotate its output shaft when the continuous running time has exceeded the upper limit and the shifting control of the transmission portion is initiated after completion of the other of the engine control and the shifting control, where these two controls are concurrently required to be implemented. Accordingly, one of the engine control to rotate the engine output shaft and the shifting control is not implemented in the process of the other of the engine control and shifting control, making it possible to prevent deterioration of the shifting shock and the shock due to the engine control.

(6) The engine control apparatus according to the above-described mode (1), wherein the drive system further includes an electric motor operatively connected to a drive wheel of the vehicle, and the engine control portion is configured to implement the control to rotate an output shaft of the engine when a running speed of the vehicle in a motor drive mode in which the vehicle runs with the electric motor while the engine is held at rest has exceeded a predetermined upper limit, and wherein the engine control portion initiates one of the control of the engine to rotate its output shaft when the running speed has exceeded the upper limit and the shifting control after completion of the other of the control of the engine and the shifting control, when the above-indicated control of the engine to rotate its output shaft and the shifting control are concurrently required to be implemented.

In the above-described mode (6) of the invention, the control of the engine to rotate its output shaft is implemented when the running speed of the vehicle running with the electric motor operatively connected to the vehicle drive wheel while the engine is held at rest has exceeded the upper limit. One of the control of the engine to rotate its output shaft when the continuous running time has exceeded the upper limit and the shifting control of the transmission portion is initiated after completion of the other of the engine control and the shifting control, where these two controls are concurrently required to be implemented. Accordingly, one of the engine control to rotate the engine output shaft and the shifting control is not implemented in the process of the other of the engine control and shifting control, making it possible to prevent deterioration of the shifting shock and the shock due to the engine control.

(7) The control apparatus according to any one of the above described modes (4)-(6), wherein the engine control portion initiates the control of the engine to rotate its output shaft after completion of the shifting control of the automatic transmission portion, when the upper limit has been reached while the control of the engine to rotate its output shaft and the shifting control are concurrently required to be implemented.

In the above-described mode (7) of the invention, the control of the engine to rotate its output shaft when the above-indicated upper limit has been reached while the control of the engine and the shifting control of the transmission portion are concurrently required to be implemented is implemented after completion of the shifting control, such that the control of the engine is implemented without an intension of the vehicle operator to implement this control of the engine. This arrangement is not only effective to prevent deterioration of the shifting shock and the shock due to the engine control, but also permits simplification of control to reduce the shocks.

(8) The engine control apparatus according to any one of the above-described modes (1)-(7), wherein the drive system comprises an electrically controlled differential portion including a differential mechanism, an electric motor connected to a rotary element of the differential mechanism, an input shaft and an output shaft, a differential state between rotating speeds of the input and output shafts being controlled by controlling an operating state of the electric motor.

In the above-described mode (8) of the present invention, the differential state between the rotating speeds of the input and output shafts of the electrically controlled differential portion of the drive system is controlled by controlling the operating state of the electric motor connected to a rotary element of the differential mechanism of the differential portion. Accordingly, the rate of rise of the operating speed of the engine and/or the rate of rise of the torque of the engine can be increased by controlling the electric motor connected to the rotary element of the differential mechanism.

(9) The engine control apparatus according to the above-described mode (8), wherein the differential mechanism includes a planetary gear set having a rotary element connected to the engine, and another rotary element connected to the electric motor, and an operating speed of the engine is raised by the electric motor.

In the above-described mode (9) of the invention wherein the planetary gear set of the differential mechanism has the rotary elements connected to the engine and the electric motor, the operating speed of the engine is raised by the electric motor. Since the engine can be operated by the electric motor through the planetary gear set, the drive system does not require an electric motor provided exclusively for starting the engine.

(10) The engine control apparatus according to any one of the above-described modes (1)-(9), wherein the requirement for implementing the control of the engine is a requirement for implementing a starting control of the engine, and the contents of the requirement include presence or absence of a requirement for a change of a drive force to drive the vehicle, the requirement for the change of the drive force is a requirement for acceleration of the vehicle.

In the above-described mode (10) of the invention, the requirement for a change of the vehicle drive force is a requirement for acceleration of the vehicle. In this case, the engine starting control is initiated at a timing according to the intention of the vehicle operator to accelerate the vehicle, or implemented by a method according to this intention.

(11) The engine control apparatus according to any one of the above-described modes (1)-(10), wherein the requirement for implementing the control of the engine is a requirement for implementing a starting control of the engine, and the contents of the requirement include presence or absence of a requirement for a change of a drive force to drive the vehicle, the requirement for the change of the drive force is a requirement for deceleration of the vehicle.

In the above-described mode (11) of the invention, the requirement for a change of the vehicle drive force is a requirement for deceleration of the vehicle. In this case, the engine starting control is initiated at a timing according to the intention of the vehicle operator to decelerate the vehicle, or implemented by a method according to this intension.

(12) The engine control apparatus according to the above-described mode (11), wherein the engine control portion initiates a rotary motion of the engine for starting the engine when the requirement for deceleration of the vehicle is present.

In the above-described mode (12) of the invention wherein the rotary motion of the engine is initiated to start the engine when the requirement for deceleration of the vehicle is present, the engine can be started by initiating the rotary motion of the engine when the vehicle operator requires deceleration of the vehicle.

(13) The engine control apparatus according to the above-described mode (11), wherein the drive system includes a manually operable shifting device, and the requirement for deceleration of the vehicle is detected when the manually operable shifting device is operated by an operator of the vehicle, to shift down the transmission portion.

In the above-described mode (13) of the invention wherein the drive system includes the manually operable shifting device, the requirement for deceleration of the vehicle is detected when the shifting device is operated by the vehicle operator to shift down the transmission portion. Accordingly, the intention of the vehicle operator to decelerate the vehicle can be easily detected.

(14) The engine control apparatus according to the above-described mode (11), wherein the drive system includes a braking operating member manually operable to brake the vehicle, and the requirement for deceleration of the vehicle is detected when the brake operating member is operated by an operator of the vehicle to brake the vehicle.

In the above-described mode (14) of the invention wherein the drive system includes the manually operable brake operating member for braking the vehicle, the requirement for deceleration of the vehicle is detected when the brake operating member is operated by the vehicle operator to brake the vehicle. Accordingly, the intention of the vehicle operator to decelerate the vehicle can be easily detected.

(15) The engine control apparatus according to the above-described mode (11), wherein the drive system includes a towing switch which is turned on to change a control mode of the drive system when the vehicle tows another vehicle, and the requirement for deceleration of the vehicle is detected when the towing switch is turned on.

In the above-describe mode (15) of the invention wherein the drive system includes the towing switch which is turned on to change the control mode of the drive system when the vehicle runs to tow another vehicle, the requirement for deceleration of the vehicle is detected when the towing switch is placed in the on state. Accordingly, the intension of the vehicle operator to decelerate the vehicle can be easily detected.

(16) The engine control apparatus according to any one of the above-described modes (1)-(15), wherein the engine control portion starts the engine at an earlier point of time when the requirement for implementing the control of the engine reflects an intension of an operator of the vehicle to change a drive force to drive the vehicle, than when the requirement does not reflect the intention of the operator and the engine is started after completion of the shifting control of the transmission portion, where the control of the engine and the shifting control are concurrently required to be implemented.

In the above-described mode (16) of the invention, the engine is started at an earlier point of time when the requirement for implementing the control of the engine reflects the intention of the vehicle operator to change the vehicle drive force than when the requirement does not reflect the above-indicated intention of the vehicle operator. Where the starting of the engine is required because of an insufficient amount of electric energy stored in a battery of the drive system, for example, this requirement for implementing the starting control of the engine does not reflect the intention of the vehicle operator to change the vehicle drive force. In this case, therefore, the timing of starting of the engine is not advanced.

(17) The engine control apparatus according to any one of the above-descried modes (1)-(15), wherein the engine control portion controls a rate of rise of an operating speed of the engine and/or a rate of rise of an operating speed of the engine, and/or a timing of ignition of the engine, such that the rate of rise of the operating speed and/or the rate of rise of the torque is/are higher, and/or the operating speed of the engine at which the engine is ignited is lower, when the requirement for implementing the control of the engine reflects an intention of an operator of the vehicle to change a drive force to drive the vehicle, than when the requirement does not reflects the above-indicated intension of the operator and the engine is started after completion of the shifting control of the transmission portion, where the control of the engine and the shifting control are concurrently required to be implemented.

In the above-described mode (17) of the invention, a rate of rise of an operating speed of the engine and/or a rate of rise of an operating speed of the engine, and/or a timing of ignition of the engine is/are controlled such that the rate of rise of the operating speed and/or the rate of rise of the torque is/are higher, and/or the operating speed of the engine at which the engine is ignited is lower, when the requirement for implementing the control of the engine reflects an intention of an operator of the vehicle to change a drive force to drive the vehicle, than when the requirement does not reflects the above-indicated intension of the operator. Where the starting of the engine is required because of an insufficient amount of electric energy stored in a battery of the drive system, for example, this requirement for implementing the starting control of the engine does not reflect the intention of the vehicle operator to change the vehicle drive force. In this case, therefore, the rate of rise of the engine speed and/or the rate of rise of the engine torque, and/or the timing of the engine ignition is/are not changed.

(18) An engine control apparatus for a vehicle provided with a drive system including an engine and a transmission portion which constitutes a part of a power transmitting path, the engine control apparatus comprising an engine control portion configured to change a method of a control of the engine according to contents of a requirement for implementing the control of the engine, when the control of the engine and a shifting control of the transmission portion are concurrently required to be implemented.

In the engine control apparatus of the above-described mode (18) according to a second aspect of this invention, the method of the control of the engine is changed according to the contents of the requirement for implementing the control of the engine, when the control of the engine and the shifting control of the transmission portion are concurrently required to be implemented. Accordingly, the control of the engine is implemented by the method according to the contents of the requirement for the engine control that are based on the intention of an operator of the vehicle. Accordingly, the present engine control apparatus simplifies the shifting control and the engine control while assuring both an improved response to the intention of the vehicle operator and reduction of a shifting shock of the transmission portion.

(19) The engine control apparatus according to the above-described mode (18), wherein the requirement for implementing the control of the engine is a requirement for implementing a starting control of the engine, and the contents of the requirement include presence or absence of a requirement for a change of a drive force to drive the vehicle, the engine control portion controls a rate of rise of an operating speed of the engine and/or a rate of rise of a torque of the engine such that the rate of rise of the operating speed of the engine and/or the rate of rise of the torque of the engine is/are higher when the requirement for the change of the drive force is present than when the requirement for the change is absent.

In the above-described mode (19) of the invention, the rate of rise of the operating speed of the engine and/or the rate of rise of the torque of the engine is/are made higher when the requirement for a change of the vehicle drive force is present than when the requirement for the change of the vehicle drive force is absent. This arrangement permits an improved response to the vehicle operator's desire to change the vehicle drive force. When the vehicle operator does not desire to change the vehicle drive force, on the other hand, the rate of rise of the operating speed of the engine and/or the rate of rise of the torque of the engine is not increased, so that deterioration of the shifting shock or the engine starting shock is prevented when the vehicle operator does not desire to change the vehicle drive force.

(20) The engine control apparatus according to the above-described mode (19), wherein the engine control portion implements the control of the engine prior to completion of the shifting control of the transmission portion.

In the above-described mode (20) of the invention wherein the control of the engine is implemented prior to completion of the shifting control of the transmission portion, the engine is controlled in the process of the shifting control of the transmission portion, so that the response to the intention of the vehicle operator to change the vehicle drive force is improved.

(21) The engine control apparatus according to the above-described mode (19), wherein the engine control portion increases the rate of rise of the operating speed of the engine and/or the rate of rise of the torque of the engine, by advancing an ignition timing of the engine.

In the above-described mode (12) of the invention wherein the rate of rise of the engine speed and/or the rate of rise of the engine torque is/are increased by advancing the ignition timing of the engine, the response to the intention of the vehicle operator to change the vehicle drive force is improved.

(22) The engine control apparatus according to the above-described mode (19), wherein the engine control portion increases the rate of rise of the operating speed of the engine and/or the rate of rise of the torque of the engine, by increasing an intake air quantity of the engine.

In the above-described mode (22) of the invention wherein the rate of rise of the engine speed and/or the rate of rise of the engine torque is/are increased by increasing the intake air quantity of the engine, the response to the intention of the vehicle operator to change the vehicle drive force is improved.

(23) The engine control apparatus according to the above-described mode (19)), wherein the drive system includes an electric motor that can raise the operating speed of the engine, and the engine control portion increases the rate of rise of the operating speed of the engine and/or the rate of rise of the torque of the engine, by increasing a rate of rise of an operating speed of the electric motor.

In the above-described mode (23) of the invention wherein the rate of rise of the engine speed and/or the rate of rise of the engine torque is/are increased by increasing the rate of rise of the operating speed of the electric motor, the response to the intention of the vehicle operator to change the vehicle drive force is improved.

(24) The engine control apparatus according to any one of the above-described modes (18)-(23), wherein the drive system comprises an electrically controlled differential portion including a differential mechanism, an electric motor connected to a rotary element of the differential mechanism, an input shaft and an output shaft, a differential state between rotating speeds of the input and output shafts being controlled by controlling an operating state of the electric motor.

The above-described mode (24) has the same advantage as described above with the above-described mode (8).

(25) The control apparatus according to the above-described mode (24), wherein the differential mechanism includes a planetary gear set having a rotary element connected to the engine, and another rotary element connected to the electric motor, and an operating speed of the engine is raised by the electric motor.

The above-described mode (25) has the same advantage as described above with respect to the above-described mode (9).

(26) The engine control apparatus according to any one of the above-described modes (18)-(25), wherein the requirement for implementing the control of the engine is a requirement for implementing a starting control of the engine, and the contents of the requirement include presence or absence of a requirement for a change of a drive force to drive the vehicle, the requirement for the change of the drive force is a requirement for acceleration of the vehicle.

The above-described mode (26) has the same advantage as described above with respect to the above-described mode (10).

(27) The engine control apparatus according to any one of the above-described modes (18)-(26), wherein the requirement for implementing the control of the engine is a requirement for implementing a starting control of said engine, and the contents of said requirement include presence or absence of a requirement for a change of a drive force to drive the vehicle, the requirement for said change of the drive force is a requirement for deceleration of the vehicle.

The above-described mode (27) has the same advantage as described above with respect to the above-described mode (11).

(28) The engine control apparatus according to the above-described mode (27), wherein the engine control portion initiates a rotary motion of the engine for starting the engine when the requirement for deceleration of the vehicle is present.

The above-described mode (28) has the same advantage as described above with respect to the above-described mode (12).

(29) The engine control apparatus according to the above-described mode (27), wherein the drive system includes a manually operable shifting device, and the requirement for deceleration of the vehicle is detected when the manually operable shifting device is operated by an operator of the vehicle, to shift down the transmission portion.

The above-described mode (29) has the same advantage as described above with respect to the above-described mode (13).

(30) The engine control apparatus according to the above-described mode (27), wherein the drive system includes a braking operating member manually operable to brake the vehicle, and the requirement for deceleration of the vehicle is detected when the brake operating member is operated by an operator of the vehicle to brake the vehicle.

The above-described mode (30) has the same advantage as described above with respect to the above-described mode (14).

(31) The engine control apparatus according to the above-described mode (27), ), wherein the drive system includes a towing switch which is turned on to change a control mode of the drive system when the vehicle tows another vehicle, and the requirement for deceleration of the vehicle is detected when the towing switch is turned on.

The above-described mode (31) has the same advantage as described above with respect to the above-described mode (15).

(32) The engine control apparatus according to any one of the above-described modes (18)-(31), wherein the engine control portion starts the engine at an earlier point of time when the requirement for implementing the control of the engine reflects an intention of an operator of the vehicle to change a drive force to drive the vehicle, than when the requirement does not reflect said intention of the operator and the engine is started after completion of the shifting control of the transmission portion, where the control of the engine and the shifting control are concurrently required to be implemented.

The above-described mode (32) has the same advantage as described above with respect to the above-described mode (16).

(33) The engine control apparatus according to any one of the above-described modes (18)-(31), wherein the engine control portion controls a rate of rise of an operating speed of the engine and/or a rate of rise of an operating speed of the engine, and/or a timing of ignition of the engine, such that the rate of rise of the operating speed and/or the rate of rise of the torque is/are higher, and/or the operating speed of the engine at which the engine is ignited is lower, when the requirement for implementing the control of the engine reflects an intention of an operator of the vehicle to change a drive force to drive the vehicle, than when the requirement does not reflects the above-indicated intension of the operator and the engine is started after completion of the shifting control of the transmission portion, where the control of the engine and the shifting control are concurrently required to be implemented.

The above-described mode (33) has the same advantage as described above with respect to the above-described mode (17).

BRIEF DESCRIPTION OF THE DRAWINGS

The above and other objects, features, advantages, and technical and industrial significance of this invention will be better understood by reading the following detailed description of preferred embodiments of the present invention, when considered in connection with the accompanying drawings, in which:

FIG. 14 is a time chart for explaining an example of a control operation of the engine control apparatus of the second embodiment to control the engine.

DETAILED DESCRIPTION OF THE PREFERRED EMBODIMENT

Figures 1, 2:
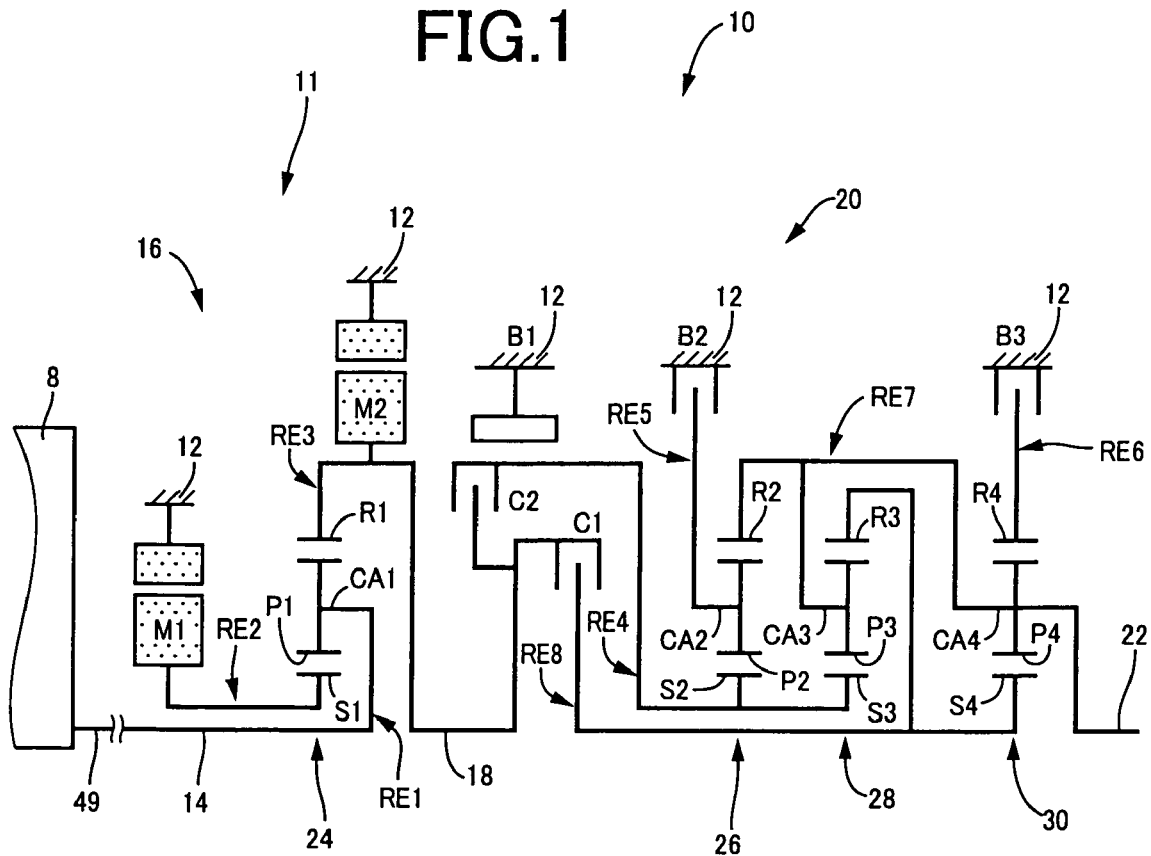
FIG. 1 is a schematic view showing an arrangement of a drive system of a hybrid vehicle, which includes an engine controlled by an engine control apparatus constructed according to this invention, and a transmission mechanism.
FIG. 2 is a table indicating shifting actions of an automatic transmission portion provided in the transmission mechanism of FIG. 1, in relation to different combinations of operating states of hydraulically operated frictional coupling devices to effect the respective shifting actions.
Figure 7:
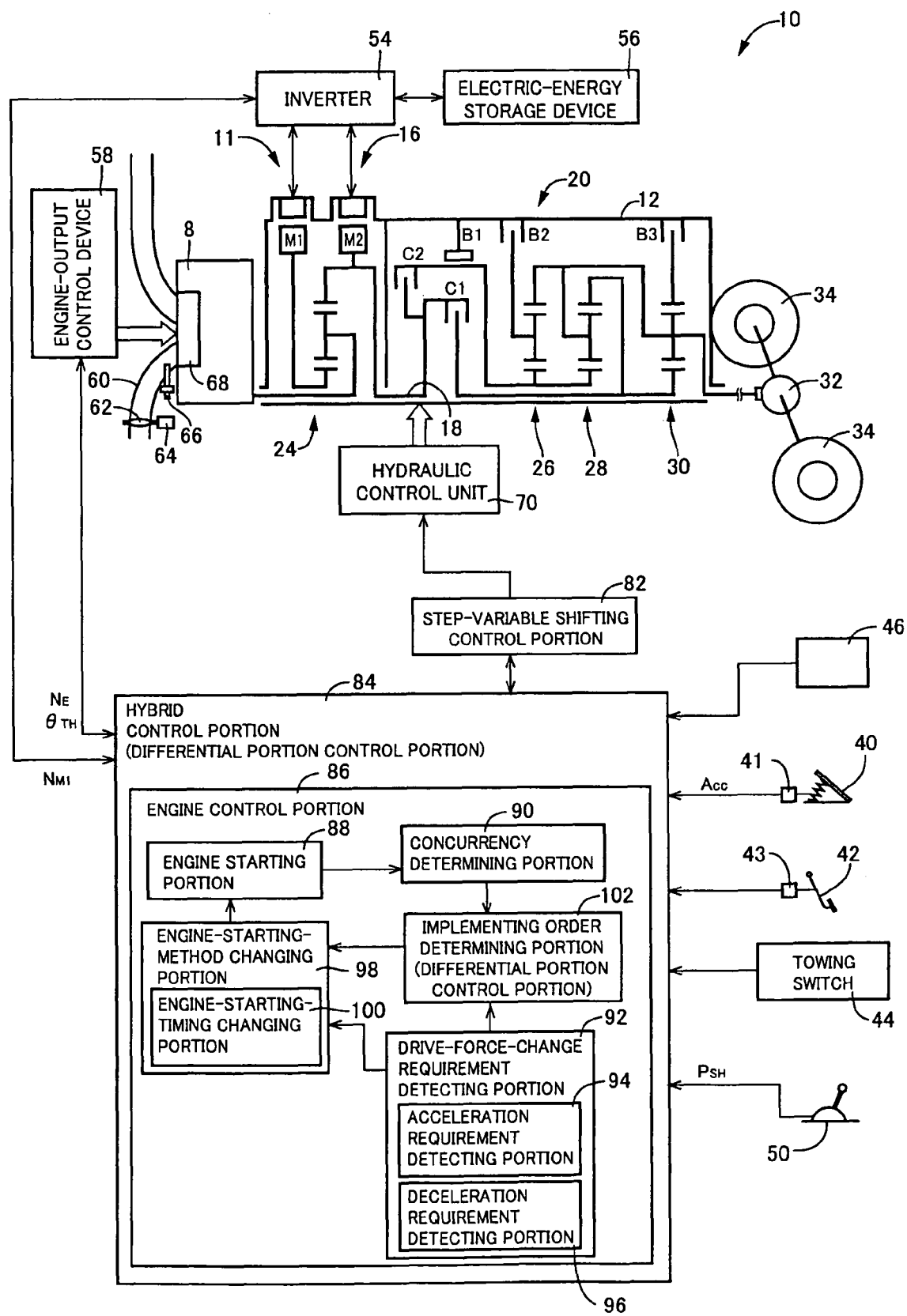
FIG. 7 is a functional block diagram illustrating major control functions of the electronic control device of FIG. 4 constructed according to a first embodiment of the present invention.

Referring first to the schematic view of FIG. 1, there is shown a drive system of a hybrid vehicle, which includes an engine 8, and a transmission mechanism 10 constituting a part of a power transmitting system. The engine 8 is controlled by an engine control apparatus constructed according to this invention. As shown in FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of a hydraulic automatic transmission portion 20 disposed between the differential portion 11 and drive wheels 34 (shown in FIG. 7) of the hybrid vehicle, and connected in series via a power transmitting member 18 (power transmitting shaft) to the differential portion 11 and the drive wheels 34; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper. The engine 8 has an output shaft 49.

In the transmission mechanism 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1.

The differential portion 11 is provided with: a first electric motor M1; a power distributing mechanism 16 functioning as a differential mechanism operable to mechanically distribute an output of the engine 8 received by the input shaft 14 from the output shaft 49, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as a major component, a first planetary gear set 24 of a single pinion type having a gear ratio ρ1 of about 0.418, for example. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The power distributing mechanism 16 constructed as described above is operated in a differential state in which three elements of the first planetary gear set 24 consisting of the first sun gear S1, first carrier CA1 and first ring gear R1 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Namely, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio γ0 (rotating speed $N_{IN}$ of the input shaft 14/rotating speed $N_{18}$ of the power transmitting member 18) of the differential portion 11 is continuously changed from a minimum value γ0min to a maximum value γ0max, that is, in the continuously-variable shifting state in which the differential portion 11 functions as an electrically controlled differential portion the speed ratio γ0 of which is continuously variable from the minimum value γ0min to the maximum value γ0max.

The automatic transmission portion 20 includes a single-pinion type second planetary gear set 26, a single-pinion type third planetary gear set 28 and a single-pinion type fourth planetary gear set 30. Thus, the automatic transmission portion 20 is a multiple-step transmission of a planetary gear type. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

Thus, the automatic transmission portion 20 and the differential portion 11 (power transmitting member 18) are selectively connected to each other through one of the first and second clutches C1, C2, which are provided to shift the automatic transmission portion 20. In other words, the first and second clutches C1, C2 function as coupling devices operable to switch a power transmitting path between the power distributing member 18 and the automatic transmission portion 20 (power transmitting path between the differential portion 11 or power transmitting member 18 and the drive wheels 34), to a selected one of a power transmitting state in which a vehicle drive force can be transmitted through the power transmitting path, and a power cut-off state (non-power-transmitting state) in which the vehicle drive force cannot be transmitted through the power transmitting path. When at least one of the first and second clutches C1 and C2 is placed in the engaged state, the power transmitting path is placed in the power transmitting state. When both of the first and second clutches C1, C2 are placed in the released state, the power transmitting path is placed in the power cut-off state.

The automatic transmission portion 20 is operable to perform a so-called "clutch-to-clutch" shifting action to establish a selected one of its operating positions (gear positions) by an engaging action of one of coupling devices and a releasing action of another coupling device. The above-indicated operating positions have respective speed ratios γ (rotating speed $N_{18}$ of the power transmitting member 18/rotating speed $N_{OUT}$ of the output shaft 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 cooperate with each other to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio of the hybrid vehicle drive system when the automatic transmission portion 20 is placed in the selected gear position M is continuously variable over a predetermined range. Accordingly, an overall speed ratio γT of the transmission mechanism 10 (rotating speed $N_{IN}$ of the input shaft 14/rotating speed $N_{OUT}$ of the output shaft 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio γT of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio =T of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
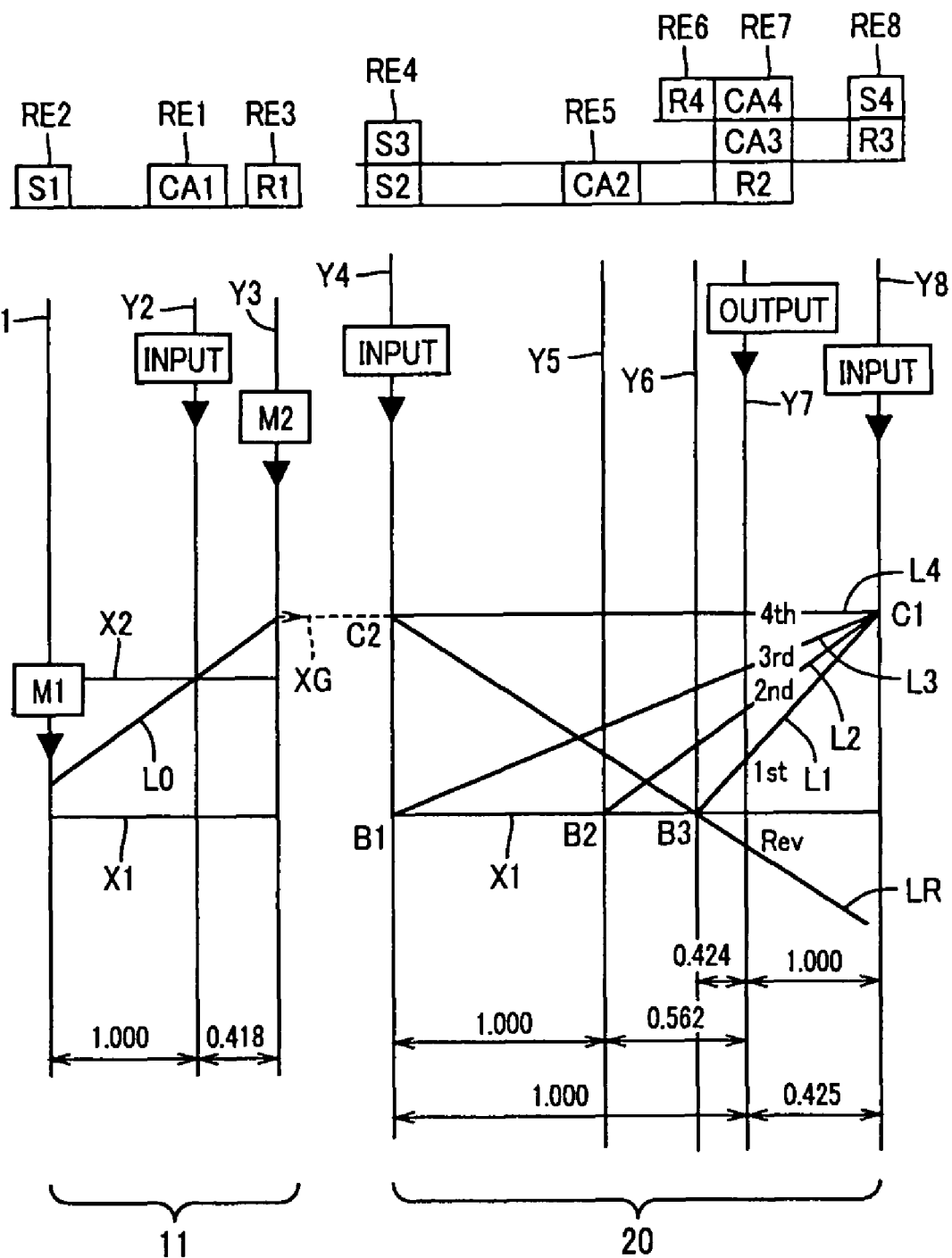
FIG. 3 is a collinear chart indicating relative rotating speeds of rotary elements of an electrically controlled differential portion and the automatic transmission portion of the drive system of FIG. 1.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines, Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8), and the second rotary element RE2 is fixed to the first electric motor M1, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the first sun gear S1, that is, the rotating speed of the first electric motor M1, which is represented by a point of intersection between the straight line L0 and the vertical line Y1, is raised or lowered by controlling the engine speed $N_E$, so that the rotating speed of the first carrier CA1 represented by a point of intersection between the straight line L0 and the vertical line Y2, if the rotating speed of the first ring gear R1 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the first sun gear S1 is made equal to the engine speed $N_E$, the straight line L0 is aligned with the horizontal line X2, so that the first ring gear R1, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the first sun gear S1 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed $N_E$ is input to the eighth rotary element RE8 of the automatic transmission portion 20. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
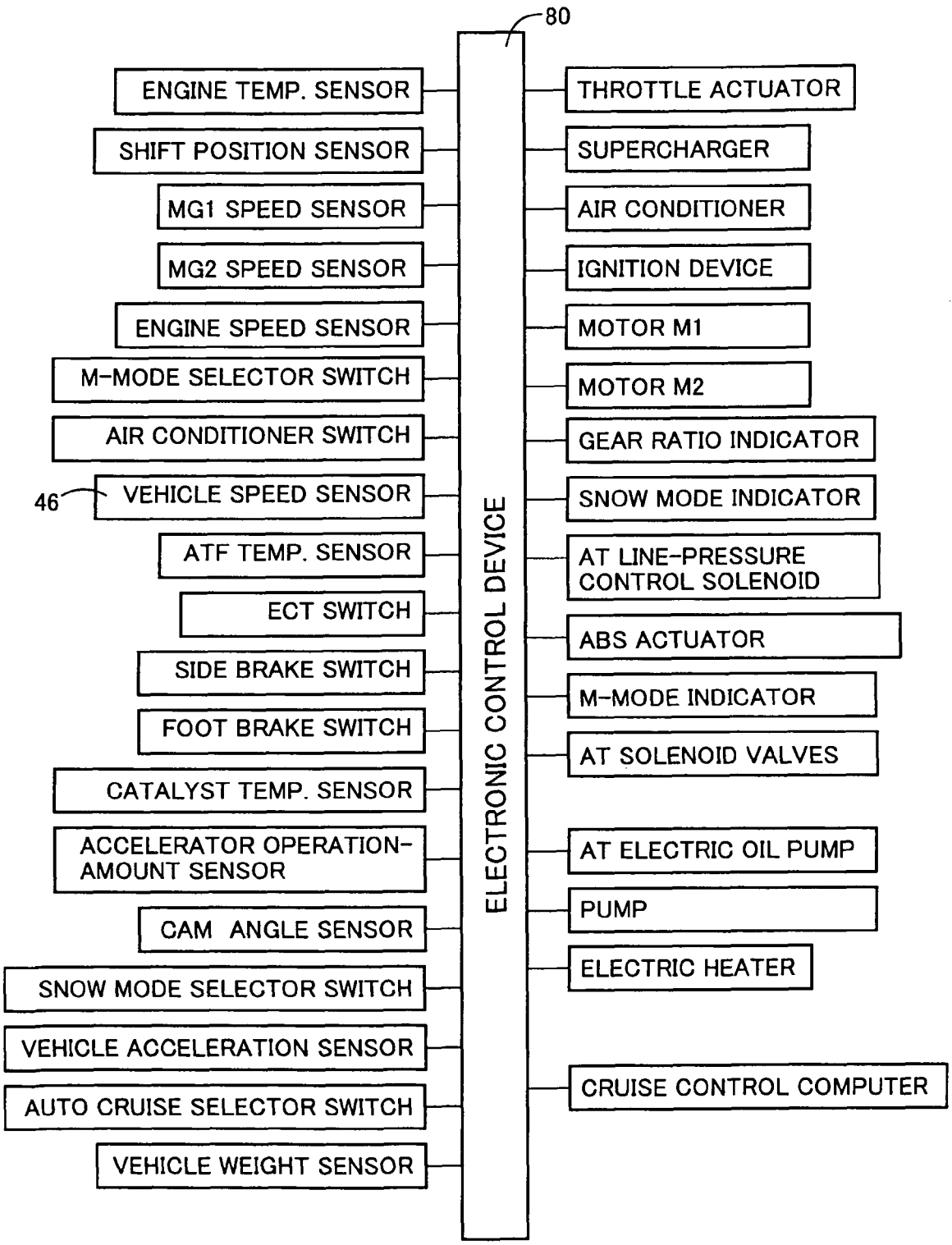
FIG. 4 is a view indicating input and output signals of an electronic control device serving as the engine control apparatus to control the engine of the drive system of FIG. 1.

FIG. 4 illustrates signals received and generated by an electronic control device 80 provided to control the engine 8 and the transmission mechanism 10. This electronic control device 80 serves as the engine control apparatus according to a first embodiment of the present invention. The electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as a shifting control of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of operating positions $P_{SH}$ of a manually operable shifting member in the form of a shift lever 52 (shown in FIG. 6); a signal indicative of the number of operations of the shift lever 52 from a manual forward-drive shifting position M (described below); a signal indicative of the operating speed $N_E$ of the engine 8; a signal indicative of an M mode (manual shifting mode); a signal indicative of an operated state of an air conditioner; an output signal of a vehicle speed sensor 46 indicative of the rotating speed $N_{OUT}$ of the output shaft 22 (hereinafter referred to as "output shaft speed"), which corresponds to a running speed V of the hybrid vehicle; a signal indicative of a temperature $TH_{ATF}$ of a working fluid or oil of the automatic transmission portion 20; a signal indicative of an operated state of a side brake; an output signal of a brake pedal switch 43 indicative of an operated state of a brake operating member in the form of a brake pedal 42 (shown in FIG. 7); a signal indicative of a temperature of a catalyst; an output signal of an accelerator pedal sensor 41 indicative of a required amount of an output of the vehicle in the form of an amount of operation (an angle of operation) $A_{CC}$ of an accelerator pedal 40 (shown in FIG. 7); a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the wheels of the vehicle; a signal indicative of a rotating speed $N_{M1}$ of the first electric motor M1 (hereinafter referred to as "first electric motor speed $N_{M1}$, where appropriate); and a signal indicative of a rotating speed $N_{M2}$ of the second electric motor M2 (hereinafter referred to as "second electric motor speed $N_{M2}$, where appropriate).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $θ_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves in the form of linear solenoid valves incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; a signal to control an electrically operated oil pump which is hydraulic pressure source for generating a hydraulic pressure that is regulated to the line pressure PL; and a signal to drive an electric heater; a signal to be applied to a cruise-control computer.

Figure 5:
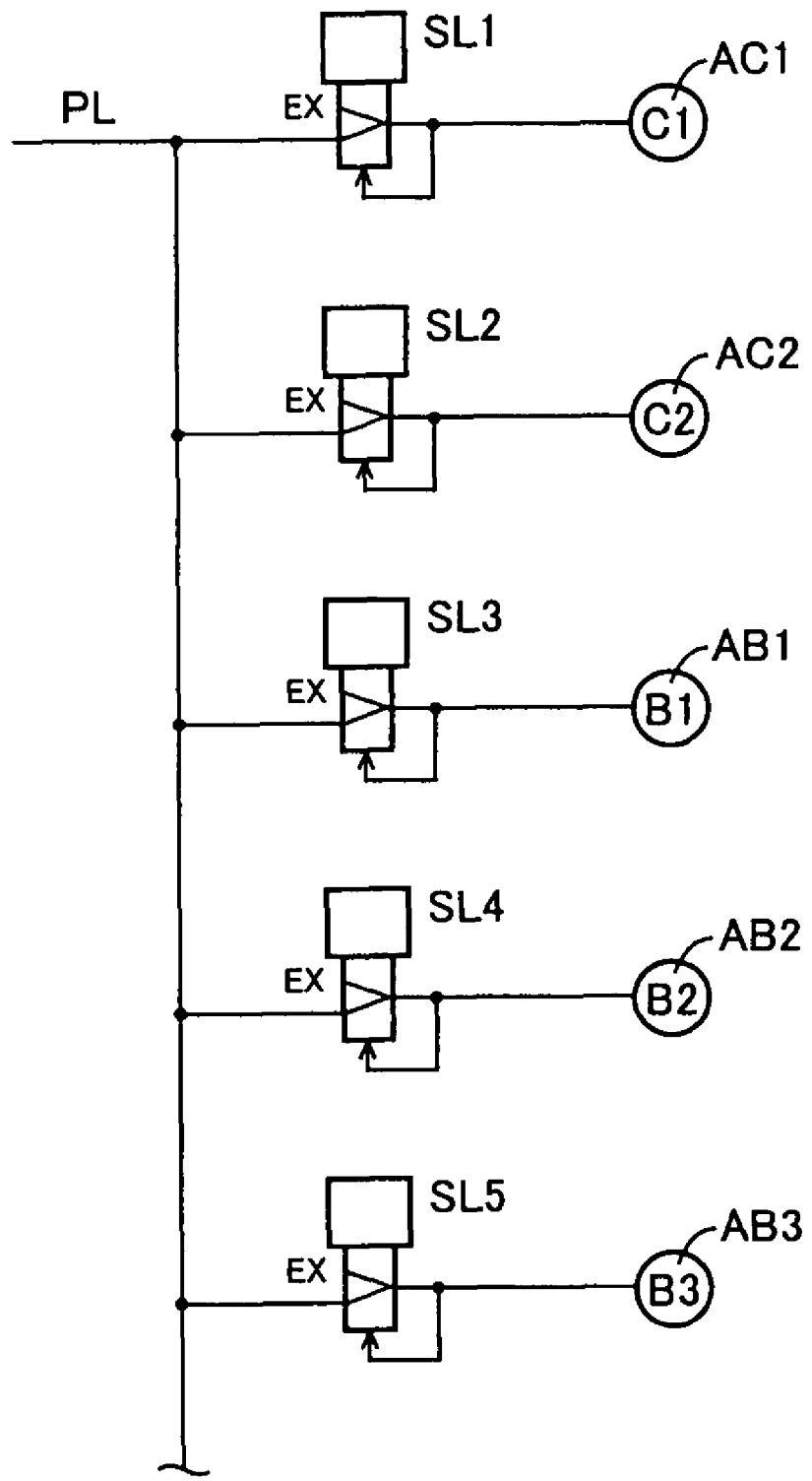
FIG. 5 is a circuit diagram showing hydraulic actuators provided in a hydraulic control unit, for operating clutches C and brakes B incorporated in the automatic transmission portion, and linear solenoid valves for controlling the hydraulic actuators.

FIG. 5 shows a hydraulic circuit of the hydraulic control unit 70 arranged to control linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by the mechanical oil pump 40 driven by the engine 8 or the electric oil pump 76 provided in addition to the mechanical oil pump 40, and which is regulated by a relief-type pressure regulator valve according to a load of the engine 8 as represented by an operation amount $A_{CC}$ of the accelerator pedal 116 or the opening angle $\theta_{TH}$ of the electronic throttle valve 62, for example.

The linear solenoid valves SL1-SL5 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of one of the coupling devices (C, B) and a releasing action of another of the coupling devices, which take place concurrently.

Figure 6:
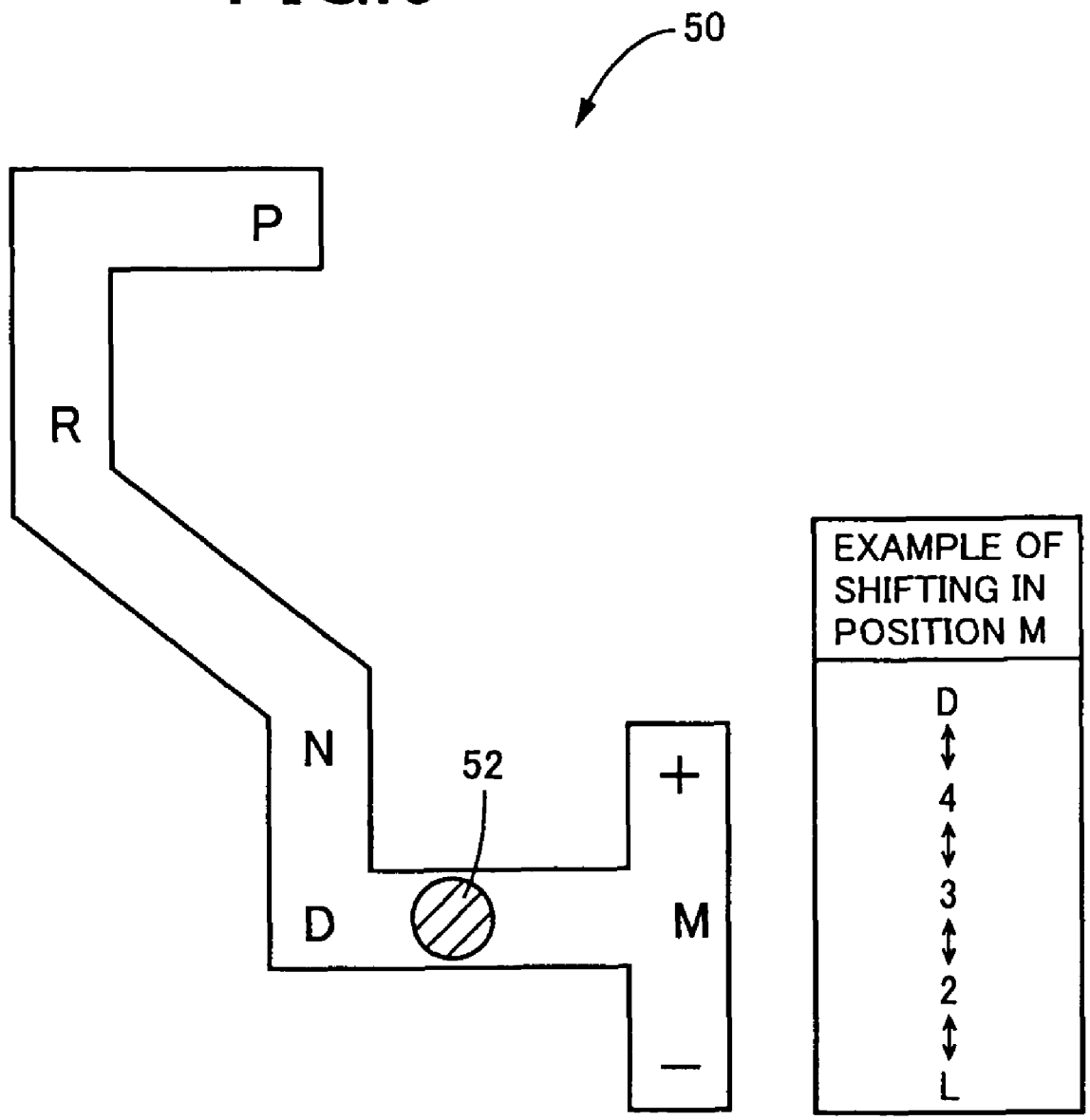
FIG. 6 is a view showing an example of a manually operated shifting device including a shift lever and operable to select one of a plurality of shift positions.

FIG. 6 shows an example Of a manually operable shifting device in the form of a shifting device 50 (also shown in FIG. 7). The shifting device 50 includes the above-described shift lever 52, which is disposed laterally adjacent to an operator's seat of the vehicle, for example, and which is manually operated to select one of the plurality of operating positions $P_{SH}$.

The operating positions $P_{SH}$ of the shift lever 52 consists of: a parking position P for placing the transmission mechanism 10 (namely, automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the transmission mechanism 10 in the neutral state; an automatic forward-drive shifting position D for establishing an automatic shifting mode; and the above-indicated manual forward-drive shifting position M for establishing a manual shifting mode. In the automatic shifting mode, the overall speed ratio $\gamma T$ is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power cut-off state to the power transmitting state. A manual operation of the shift lever 52 from the neutral position N to the automatic forward-drive position D causes at least the first clutch C1 to be engaged for switching the power transmitting path in the automatic transmission portion 20 from the power cut-off state to the power transmitting state. A manual operation of the shift lever 52 from the rear-drive position R to the parking position P or neutral position N cause the second clutch C2 to be released for switching the power transmitting path in the automatic transmission portion 20 from the power transmitting state to the power cut-off state. A manual operation of the shift lever 52 from the automatic forward-drive position D to the neutral position N causes the first clutch C1 and the second clutch C2 to be released for switching the power transmitting path from the power transmitting state to the power cut-off state.

When the shift lever 52 is placed in the automatic forward-drive position "D", the automatic transmission portion 20 is automatically shiftable to any one of the first through fourth gear positions. When the shift lever 52 is placed in the manual forward-drive position "M", the shifting device 50 is placed in one of four positions "4", "3", "2" and "1" indicated in FIG. 6, by moving the shift lever 52 from the manual forward-drive position "M" to a shift-up position "+" or a shift-down position "−". When the shifting device 50 is placed in the position "4", the vehicle is driven with the automatic transmission portion 20 placed in the fourth gear position. Similarly, the vehicle is driven with the automatic transmission 20 placed in the third, second and first gear positions when the shifting device 50 is placed in the position "3", "2" and "1", respectively. The shift lever 52 is biased by a spring or other suitable biasing means toward the manual forward-drive position "M", so that the shift lever 52 is automatically returned from the shift-up position "+" or shift-down position "−" to the position "M". The shifting device 50 is shifted from one of the positions "1", "2", "3" and "4" to another according to the number of operations of the shift lever 52 to the shift-up or shift-down position "+", "−", or the time duration during which the shift lever 52 is held in the shift-up or shift-down position ";", "−". Thus, the manually operable shifting device 50 permits the vehicle operator to manually select one of the gear positions of the automatic transmission portion 20 by operating the shift lever 52.

Referring to the functional block diagram of FIG. 7, the electronic control device 80 includes a step-variable shifting control portion 82 and a hybrid control portion 84. The step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle as represented by the actual vehicle speed V (km/h), and the actual output torque $T_{OUT}$ of the automatic transmission portion 20 calculated on the basis of the operation amount $A_{CC}$ of the accelerator pedal 40, and according to a stored shifting boundary line map (shifting control map or relation) which represents the shift-up boundary lines indicated by solid lines in FIG. 8 and the shift-down boundary lines indicated by one-dot chain lines in FIG. 8. The step-variable shifting control portion 82 implements a shifting control of the automatic transmission portion 20 to establish the determined gear position.

For establishing the determined gear position of the automatic transmission portion 20, the step-variable shifting control portion 82 generates a shifting command (hydraulic control command) to be applied to the hydraulic control unit 70, to engage and release the appropriate two hydraulically operated frictional coupling devices (C1, C2, B1, B2, B3), according to the table of FIG. 2. Described in detail, the step-variable shifting control portion 82 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

The hybrid control portion 84 functions as a differential portion control portion, and controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously-variable transmission. For instance, the hybrid control portion 84 calculates a target (required) vehicle output at the present running speed V of the vehicle, on the basis of the operation amount $A_{CC}$ of the accelerator pedal 40 used as an operator's required vehicle output and the vehicle running speed V, and calculate a target total vehicle output on the basis of the calculated target vehicle output and a required amount of generation of an electric energy by the first electric motor M1. The hybrid control portion 84 calculates a target output of the engine 8 to obtain the calculated target total vehicle output, while taking account of a power transmission loss, a load acting on various devices of the vehicle, an assisting torque generated by the second electric motor M2, etc. The hybrid control portion 84 controls the speed $N_E$ and torque $T_E$ of the engine 8, so as to obtain the calculated target engine output, and the amount of generation of the electric energy by the first electric motor M1.

The hybrid control portion 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control portion 82 determines a target value of the overall speed ratio γT of the transmission mechanism 10, so that the engine 8 is operated according to a stored highest-fuel-economy curve (fuel-economy map or relation). The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio γ0 of the differential portion 11, so as to obtain the target value of the overall speed ratio γT, so that the overall speed ratio γT can be controlled within a predetermined range.

In the hybrid control, the hybrid control portion 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

When the shifting control to control a shifting action of the automatic transmission portion 20 is implemented under the control of the step-variable shifting control portion 82, the overall speed ratio γT of the transmission mechanism 10 is changed in steps due to a stepping change of the speed ratio of the automatic transmission portion 20 during its shifting action. A change of the overall speed ratio γT in steps rather than continuously, namely, a stepping change of the overall speed ratio γT permits a more rapid change of the overall speed ratio γT, but on the other hand may cause a shifting shock of the transmission mechanism 10, or a failure to control the engine speed $N_E$ following the highest fuel-economy curve and consequent reduction of the fuel economy.

In view of the potential drawback indicated above, the hybrid control portion 84 is configured to control the speed ratio of the differential portion 11 in synchronization with a shifting action of the automatic transmission portion 20, such that the speed ratio of the differential portion 11 changes in a direction opposite to a direction of the stepping change of the speed ratio of the automatic transmission portion 20, for thereby reducing the stepping change of the overall speed ratio γT. In other words, the hybrid control portion 84 is configured to implement a shifting control of the differential portion 11 in synchronization with the shifting action of the automatic transmission portion 20, such that the overall speed ratio γT of the transmission mechanism 10 changes continuously during the shifting action of the automatic transmission portion 20. For instance, the hybrid control portion 84 implements the shifting control of the differential portion 11 in synchronization with the shifting action of the automatic transmission portion 20, such that the speed ratio of the differential portion 11 changes in steps in the direction opposite to the direction of the stepping change of the speed ratio of the automatic transmission portion 20, by an amount equal to an amount of the stepping change of the automatic transmission portion 20 for thereby preventing a transient stepping change of the overall speed ratio γT of the transmission mechanism 10 during the shifting action of the automatic transmission portion 20.

The hybrid control portion 84 is further arranged to hold the engine speed $N_E$ substantially constant or at a desired value, by controlling the first electric motor speed $N_{M1}$ owing to the electric CVT function of the differential portion 11, irrespective of whether the vehicle is stationary or running. In other words, the hybrid control portion 84 is capable of controlling the first electric motor speed $N_{M1}$ as desired while holding the engine speed $N_E$ substantially constant or at a desired value. For example, the hybrid control portion 84 raises the engine speed $N_E$ by raising the first electric motor speed $N_{M1}$ during running of the vehicle while the second electric motor speed $N_{M2}$ determined by the vehicle running speed V (rotating speed of the drive wheels 34) is held substantially constant. To raise the engine speed $N_E$ during running of the vehicle, for example, the hybrid control portion 84 raises the first electric motor speed $N_{M1}$ while the second electric motor speed $N_{M2}$ determined by the vehicle speed V (rotating speed of the drive wheels 34) is held substantially constant, as is apparent from the collinear chart of FIG. 3.

The hybrid control portion 84 includes engine output control means functioning to command the engine-output control device 58 for controlling the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control portion 84 is basically arranged to control the throttle actuator 64 on the basis of the operation amount $A_{CC}$ of the accelerator pedal and according to a predetermined stored relationship (not shown) between the operation amount $A_{CC}$ and the opening angle $\theta_{TH}$ of the electronic throttle valve 62 such that the opening angle $\theta_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control portion 84.

The hybrid control portion 84 is capable of establishing a motor-drive mode to drive the vehicle by the electric motor, by utilizing the electric CVT function (differential function) of the differential portion 11, irrespective of whether the engine 8 is in the non-operated state or in the idling state.

Figure 8:
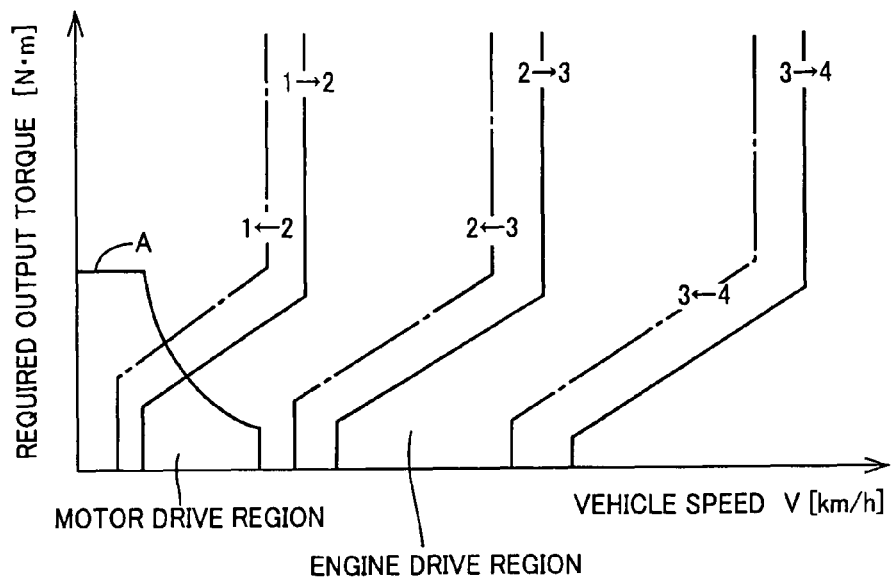
FIG. 8 is a view illustrating an example of a stored shifting boundary line map used for determining a shifting action of the automatic transmission portion, and an example of a stored drive-power-source switching boundary line map used for switch a vehicle drive mode between an engine drive mode and a motor drive mode, the shifting and switching boundary line maps being defined in the same two-dimensional coordinate system, in relation to each other.

For example, the hybrid control portion 84 is configured to determine whether the vehicle running condition represented by the actual output shaft speed $N_{OUT}$ and the required output torque $T_{OUT}$ of the automatic transmission portion 20 represented by the actual accelerator pedal operation amount $A_{CC}$ is in a motor-drive region in which the second electric motor M2 is used as the vehicle drive power source, or in an engine-drive region in which the engine 8 is used as the vehicle drive power source. This determination is made on the basis of the actual vehicle output shaft speed $N_{OUT}$ and the actual accelerator pedal operation amount $A_{CC}$, and according to a predetermined drive-power-source switching boundary line map, which is stored in a memory together with the shift-up boundary lines and shift-down boundary lines that are indicated by solid lines and one-dot chain lines, respectively. Solid line A indicated in FIG. 8 represents an example of a drive-power-source switching boundary line which defines the motor-drive region and the engine-drive region. As is understood from FIG. 8, the hybrid control portion 84 establishes the motor-drive mode when the output torque $T_{OUT}$ is in a comparatively low range in which the engine operating efficiency is comparatively low, namely, when the accelerator pedal operation amount $A_{CC}$ is in a comparatively small range, or when the output shaft speed $N_{OUT}$ is comparatively low, that is, when the vehicle load is comparatively low.

For reducing a dragging of the engine 8 in its non-operated state and improving the fuel economy in the motor-drive mode, the hybrid control portion 84 is configured to hold the engine speed $N_E$ at zero or substantially zero as needed, owing to the electric CVT function (differential function) of the differential portion 11, that is, by controlling the differential portion 11 to perform its electric CVT function, so that the first electric motor speed $N_{M1}$ is controlled to be in a non-load state, so as to be freely rotated to have a negative speed NM1.

The hybrid control portion 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34.

The hybrid control portion 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control portion 84 is arranged to place the first electric motor M1 in the non-load state, for thereby placing the differential portion 11 in a neutral state in which the power transmitting path is electrically cut off.

Thus, the shifting boundary line map indicated in FIG. 8 by way of example is determined to establish the motor-drive mode when the output torque $T_{OUT}$ or accelerator pedal operation amount $A_{CC}$ is in a comparatively low or small range in which the engine operating efficiency is comparatively low, namely, when the engine torque $T_E$ is in a comparatively low range, or when the output shaft speed $N_{OUT}$ is comparatively low, that is, when the vehicle load is comparatively low.

The hybrid control portion 84 includes an engine control portion 86 configured to start the engine 8 (while the engine 8 is at rest). The electronic control device 80 including this engine control portion 86 functions as the engine control apparatus according to the first embodiment of the invention. The engine control portion 86 includes an engine starting portion 88, a concurrency determining portion 90, a drive-force-change requirement detecting portion 92, an engine-starting-method changing portion 98, and an implementing order determining portion 102. The drive-force-change requirement detecting portion 92 includes an acceleration requirement detecting portion 94 and a deceleration requirement detecting portion 96, while the engine-starting-method changing portion 98 includes an engine-starting-timing changing portion 100. The engine starting portion 88 is configured to start the engine 8 by operating the first electric motor M1 connected to the engine 8 through the first planetary gear set 24, while the engine 8 is held at rest. Described more specifically, the operating speed of the engine 8 is raised by the first electric motor M1, to a predetermined ignition speed at which the engine 8 can be ignited and operated by itself. This operation to raise the engine speed is referred to as "engine motoring" or "cranking". When the engine speed is raised to the ignition speed, the engine starting portion 88 commands the engine output control device 58 to activate the ignition device 68 for igniting an air-fuel mixture to thereby start the engine 8. Thus, the engine control portion 86 of the engine control apparatus implements a control of the engine 8, more precisely, a starting control of the engine 8 under the control of the engine starting portion 88.

When a shifting control of the automatic transmission portion 20 by the step-variable shifting control portion 92 and the starting control of the engine 8 by the engine starting portion 88 are implemented concurrently, it is difficult to optimize a torque distribution to the coupling elements (rotary elements) of the automatic transmission portion 20 in the process of a shifting action, due to a change of the output torque of the engine 8 during the starting control of the engine 8, giving rise to a risk of deterioration of the shifting shock of the automatic transmission portion 20. On the other hand, first implementing one of the shifting control and the engine starting control and then implementing the other control after completion of implementation of the above-indicated one control unfavorably increases a time required to obtain the desired output torque of the drive system.

It is also noted that in the drive system including the engine 8 and the transmission mechanism 10, the second electric motor M2 connected to the first planetary gear set 24, is controlled to produce a reaction torque for preventing its dragging motion when the engine 8 is motored or cranked by the first electric motor M1 under the control of the engine starting portion 88. In a partially or imperfectly shifted state of the automatic transmission portion 20 in which the appropriate gear position has not been established, the output shaft 22 of the automatic transmission portion 20 does not enable the ring gear R1 of the first planetary gear set 24 to have a sufficiently large torque, making it difficult to establish a torque balance of the coupling elements (rotary elements) of the automatic transmission portion 20 while controlling the operating speed of the engine 8 in the process of the engine starting control, leading to increased complexity of the engine starting control and deterioration of a starting shock of the engine 8 and a shifting shock of the automatic transmission portion 20.

To avoid the drawbacks indicated above, the engine control portion 86 includes the above-indicated concurrency determining portion 90, drive-force-change requirement detecting portion 92, engine-starting-method changing portion 98, engine-starting-timing changing portion and implementing order determining portion 102, which are shown in the functional block diagram of FIG. 7. The concurrency determining portion 90 is configured to determine whether the step-variable shifting control portion 82 and the engine starting portion 88 concurrently determine that the shifting control of the automatic transmission portion 20 and the starting control of the engine 8 are required to be implemented, in other words, whether the shifting control and the engine starting control take place concurrently according to the determinations by the step-variable shifting control portion 82 and the engine starting portion 88. For instance, the concurrency determining portion 90 determines from time to time during one of the shifting control and the engine starting control, whether the other of the two controls should be initiated during the above-indicated one control.

The drive-force-change requirement detecting portion 92 is configured to a vehicle operator's requirement for a change of the vehicle drive force, on the basis of the operation amount ACC of the accelerator pedal 40 detected by the accelerator pedal sensor 41, the operating state of the brake pedal 42 detected by the brake pedal switch 43, and the operating state of a towing switch 44. The towing switch 44 is turned on when the hybrid vehicle tows another vehicle. When the towing switch 44 is placed in the on state, a special shifting boundary line map suitable for running of the hybrid vehicle in the towing mode is selected in place of the ordinary shifting boundary line map of FIG. 8. The special shifting boundary line map is formulated to perform an automatic shifting action of the automatic transmission portion 20 to a gear position suitable for driving the hybrid vehicle at a relatively low speed and/or with a relatively high drive torque.

The acceleration requirement detecting portion 94 and the deceleration requirement detecting portion 96 of the drive-force-change requirement detecting potion 92 are configured to detect vehicle operator's requirements for acceleration and deceleration of the hybrid vehicle, respectively, as examples of the vehicle operator's requirement for a change of the vehicle drive force. For instance, the acceleration requirement detecting portion 94 detects the vehicle operator's requirement for acceleration of the hybrid vehicle when the operation amount ACC of the accelerator pedal 40 is larger than a predetermined value, and the deceleration requirement detecting portion 96 detects the vehicle operator's requirement for deceleration of the hybrid vehicle, in at least one of the following three cases: where the brake pedal 42 is operated; where the towing switch 44 is placed in the on state; and where a manual shift-down operation is performed by the operator by operating the shift lever 52 of the shifting device 50 from the manual forward-drive position "M" to the shift-down position "−", for example.

The engine-starting-method changing portion 98 is configured to change the method of starting of the engine 8 according to the contents of the requirement for starting of the engine 8, when the concurrency determining portion 90 determines that the engines starting control and the shifting control are concurrently required to be implemented. The contents of the requirement for starting of the engine are a basis on which the engine starting control is determined to be implemented. For example, the contents of the requirement for starting of the engine are presence or absence of the vehicle operator's requirement for a change of the vehicle drive force detected by the drive-force-change requirement detecting portion 92.

For instance, the engine-starting-method changing portion 98 changes the method of starting the engine 8 such that a rate of rise of the engine speed $N_E$ and/or a rate of rise of the engine torque $T_E$ is higher when the vehicle operator's requirement for a change of the vehicle drive force (e.g., requirement for acceleration or deceleration of the hybrid vehicle) is detected by the drive-force-change requirement detecting portion 92, than when the vehicle operator's requirement for a change of the vehicle drive force is not detected by the drive-force-change requirement detecting portion 92.

Described in detail, the rate of rise of the engine speed $N_E$ and/or the rate of rise of the engine torque $T_E$ is/are increased by the engine-starting-method changing portion 98, by increasing an intake air quantity of the engine 8, for example, by controlling the throttle actuator 64 through the engine output control device 58 such that the opening angle $\theta_{TH}$ of the electronic throttle valve 62 is larger when the requirement for a change of the vehicle drive force is detected than when this requirement is not detected.

Alternatively, the rate of rise of the engine speed $N_E$ and/or the rate of rise of the engine torque $T_E$ is/are increased by the engine-starting-method changing portion 98, by raising the operating speed of the electric motor that can raise the engine speed $N_E$, for example, the operating speed $N_{M1}$ of the first electric motor M1. In this respect, it is noted that the first electric motor M1 is connected to the first sun gear S1 of the first planetary gear set 24 of the differential portion 11, while the engine 8 is connected to the first carrier CA1 of the first planetary gear set 24.

The engine-starting-method changing portion 98 may be configured to change the method of starting the engine 8, where only one of the engine starting control and the shifting control is required to be implemented after completion of the other control, as well as when both the engine starting control and the shifting control are concurrently required to be implemented.

The engine-starting-timing changing portion 100 of the engine-starting-method changing portion 98 is configured to change the timing of starting of the engine 8. Namely, a change of the timing of starting of the engine 8 by the engine-starting-timing changing portion 100 is one form of a change of the method of starting the engine 8. The engine-starting-timing changing portion 100 changes the timing of starting of the engine 8 by advancing the ignition timing of the engine 8, for example, by commanding the ignition device 68 to ignite the air-fuel mixture at a lower value of the engine speed $N_E$ when the requirement for a change of the vehicle drive force is detected by the drive-force-change requirement detecting portion 92 than when this requirement is not detected. Thus, the starting of the engine 8 can be expedited, with a result of a higher rate of rise of the engine speed $N_E$ and/or a higher rate of rise of the engine torque $T_E$ when the ignition timing is advanced than when the ignition timing is not advanced. It will be understood that the timing of starting of the engine 8 corresponds to the timing of operation control of the engine 8.

When the vehicle operator's requirement for a change of the vehicle drive force is not detected by the drive-force-change requirement detecting portion 92, the timing of starting of the engine 8 is not advanced. In this case, the shifting control and the engine starting control are implemented in the predetermined order. For example, one of the shifting control and engine starting control the implementation of which is determined at an earlier point of time is implemented prior to the other.

The implementing order determining portion 102 functions as a step-variable shifting inhibiting portion or an engine-starting inhibiting portion, and is configured to inhibit one of the shifting control and engine starting control until the other control is completed or terminated, when the vehicle operator's requirement for a change of the vehicle drive force is not detected by the drive-force-change requirement detecting portion 92 (and therefore the method of starting of the engine 8 is not changed by the engine-starting-method changing portion 98 or the timing of starting of the engine 8 is not changed by the engine-starting-timing changing portion 100), and when the shifting control and the engine starting control are not concurrently required to be implemented.

The implementing order determining portion 102 determines which one of the shifting and engine starting controls should be implemented first, depending upon one of the shifting and engine starting controls the implementation of which is determined at an earlier point of time. For example, the implementing order determining portion 102 first commands the engine starting portion 88 to implement the engine starting control and to inhibit the step-variable shifting control portion 82 from initiating the shifting control until the engine starting control is completed or terminated, if the implementation of the engine starting control is determined prior to that of the shifting control, when the concurrency determining portion 90 determines that the engine starting control and the shifting control are implemented concurrently, and when the vehicle operator's requirement for a change of the vehicle drive force is not detected by the drive-force-change requirement detecting portion 92, and therefore the method of starting of the engine 8 is not changed by the engine-starting-method changing portion 98 or the timing of starting of the engine 8 is not changed by the engine-starting-timing changing portion 100.

Figure 9:
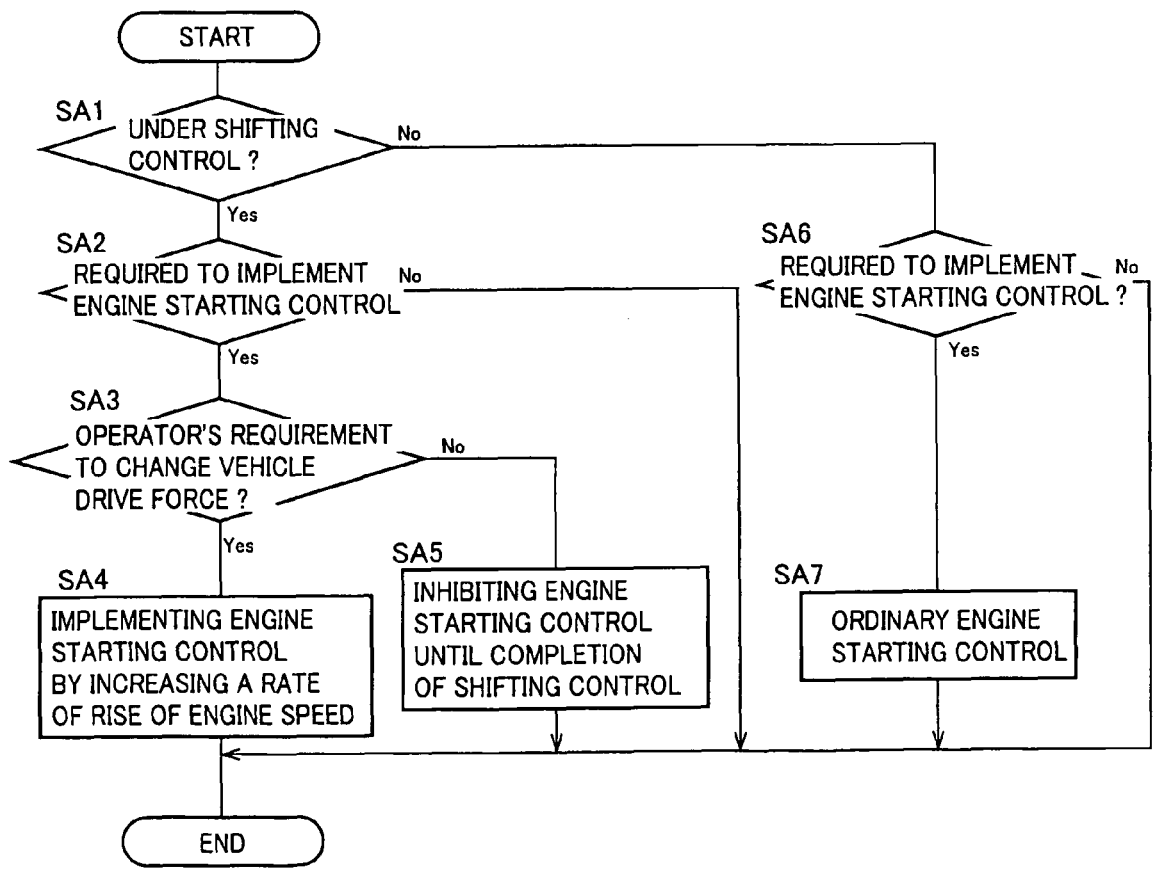
FIG. 9 is a flow chart illustrating an engine control routine executed by the electronic control device of FIG. 4.

The flow chart of FIG. 9 illustrates an engine control routine executed by the engine control portion 86. Steps SA1, SA2 and SA6 of the engine control routine correspond to the concurrency determining portion 90. The engine control routine is initiated with step SA1 to determine whether the shifting control of the automatic transmission portion 20 by the step-variable shifting control portion 82 is being implemented. If an affirmative determination is obtained in step SA1, the control flow goes to step SA2. If a negative determination is obtained in step SA1, the control flow goes to step SA6. The affirmative determination is obtained in step SA1 during a time period between a moment of determination that the shifting control of the automatic transmission portion 20 should be implemented by the step-variable shifting control portion 82 and a moment of termination of the inertia phase of the appropriate shifting action of the automatic transmission portion 20.

Step SA2 is provided to determine whether the hybrid control portion 84 determines that the starting control of the engine 8 should be implemented. If an affirmative determination is obtained in step SA2, the control flow goes to step SA3. If a negative determination is obtained in step SA2, the engine control portion 86 need not control the engine 8, and one cycle of execution of the engine control routine is terminated.

Step SA3 corresponding to the drive-force-change requirement detecting portion 92 is implemented to determine whether there exists a vehicle operator's requirement for a change of the vehicle drive force. Described in detail, this determination is made by making a determination on the basis of the operation amount $A_{CC}$ of the accelerator pedal 40 as to whether the vehicle operator requires acceleration of the hybrid vehicle, and by making a determination as to whether the vehicle operator requires deceleration of the hybrid vehicle, on the basis of the operating state of the brake pedal switch 43, the operating state of the towing switch 44, and the presence or absence of a manual shift-down operation of the shift lever 52. When the vehicle operator's requirement for a change of the vehicle drive force, that is, the vehicle operator's requirement for acceleration or deceleration of the vehicle is detected, an affirmative determination is obtained in step SA3, and the control flow goes to step SA4. If a negative determination is obtained in step SA3, the control flow goes to step SA5.

Step SA4 corresponds to the engine-starting-method changing portion 98 and the engine-starting-timing changing portion 100, and is implemented when the shifting control and the engine starting control are concurrently required to be implemented, and when there exists the vehicle operator's requirement for a change of the vehicle drive force. In step SA4, the engine-starting-timing changing portion 100 advances the timing of starting of the engine 8 even in the process of the shifting control, and the engine-starting-method changing portion 98 increases the rate of rise of the engine speed $N_E$ and/or the rate of rise of the engine torque $T_E$, as compared with the rate or rates when the vehicle operator's requirement for a change of the vehicle drive force is not detected.

Step SA5 correspond to the engine-starting-timing changing portion 100 and the implementing order determining portion 102, and is implemented when there does not exist the vehicle operator's requirement for a change of the vehicle drive force even while the shifting control and the engine starting control are concurrently required to be implemented. In step SA5, the engine starting control is implemented after completion of the shifting control, so that the engine 8 is started only after the appropriate shifting action of the automatic transmission portion 20.

Steps SA6 and SA7 are implemented when the automatic transmission portion 20 is not in the process of a shifting action. Step SA6, which is identical with step SA2 described above, is implemented to determine whether the hybrid control portion 84 determines that the starting control of the engine 8 should be implemented. If an affirmative determination is obtained, the control flow goes to step sA7. If a negative determination is obtained in step SA6, the engine control portion 86 need not control the engine 8, and one cycle of execution of the engine control routine is terminated.

Step SA7 is implemented when the affirmative determination is obtained in step SA6, that is, when the implementation of the starting control of the engine 8 is determined while the automatic transmission portion 20 is not in the process of a shifting action. In step SA7, the engine 8 is started in an ordinary manner without a change of the engine starting method or a change of the engine starting timing, since the engine starting control does not take place concurrently with the shifting control of the automatic transmission portion 20.

Figure 10:
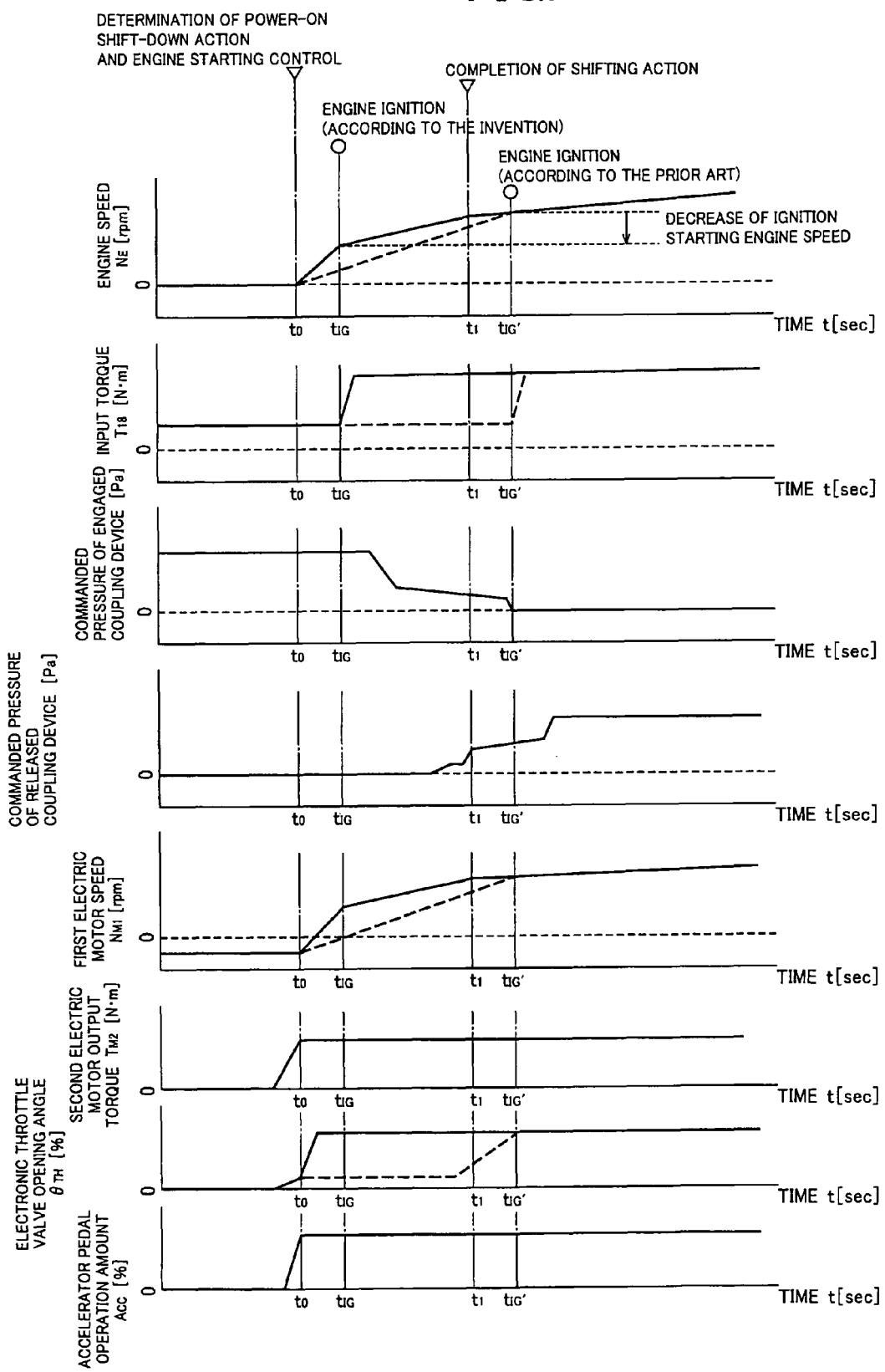
FIG. 10 is a time chart indicating changes of various parameters such as an engine speed $N_E$ when the engine is controlled by the electronic control device of FIG. 4 and a prior art engine control apparatus, in the case of determination that a shifting control for a power-on shift-down action of the automatic transmission portion and a control of the engine are concurrently required to be implemented.

Referring next to the time chart of FIG. 10, there are indicated changes of various parameters relating to the engine 8 and the automatic transmission portion 20, when the engine control is implemented by the engine control portion 86 and a prior art engine control apparatus, in the case of determination that the shifting control and the engine control are concurrently required to be implemented. The parameters include; an input torque of the automatic transmission portion 20 in the form of a torque $T_{18}$ (N·m) of the power transmitting member 18; commanded hydraulic pressures (Pa) of the two hydraulically operated frictional coupling device of the automatic transmission portion 20 which are released and engaged to perform the shifting action; the operating speed $N_{M1}$ (rpm) of the first electric motor M1; the opening angle $\theta_{TH}$ (%) of the electronic throttle valve 62; and the operation angle $A_{CC}$ (%) of the accelerator pedal 40, which are taken along the vertical axis of the time chart. Along the horizontal axis, there is taken the time "t" commonly for the different parameters. In the time chart of FIG. 10, broken lines indicate the parameters where the engine starting control is implemented by the prior art engine control apparatus, while solid lines indicate the parameters where the engine starting control is implemented by the engine control portion 86 of the engine control apparatus according to the present embodiment.

In the example of FIG. 10, it is determined at a point of time t0 that the shifting control for a power-on shift-down action of the automatic transmission portion 20 as a result of a large amount of operation $A_{CC}$ of the accelerator pedal 40 by the vehicle operator, and the starting control of the engine 8 are concurrently required to be implemented.

The engine starting control (indicated by the broken lines) implemented according to the prior art engine control apparatus will be first described. On the basis of the determination of the shift-down action at the point of time t0, the shifting control of the automatic transmission portion 20 is first initiated. Namely, the gear position to which the automatic transmission portion 20 is shifted is determined, and the two frictional coupling devices that are released and engaged to establish the determined gear position are determined by reference to the table of FIG. 2. Then, the hydraulic pressure of the frictional coupling device to be released is lowered with a suitable schedule of timing, while the hydraulic pressure of the frictional coupling device to be engaged is raised with a suitable schedule of timing. Thus, the so-called "clutch-to-clutch" shifting action of the automatic transmission portion 20 is implemented. It is determined at a point of time t1 that the shifting action is completed with termination of the inertia phase.

Where the engine starting control is implemented according to the prior art engine control apparatus, if the shifting control and the engine starting control are concurrently required to be implemented, one of the shifting and engine starting controls is not implemented in the process of the other control. Accordingly, the engine starting control is not implemented in the process of the shifting control, and is initiated only after the point of time t1 at which the shifting control or action is completed. At a point of time $t_{IG}'$, the engine speed $N_E$ has been raised to a predetermined ignition speed at which the ignition device 68 is activated to start the ignition of the engine 8. Accordingly, the torque $T_{18}$ of the power transmission member 18 is raised after the point of time $t_{IG}'$. The ignition of the engine 8 by the ignition device 68 may be expedited to start the engine 8 as soon as possible after the point of time t1 (after the moment of determination of completion of the shifting control), by controlling the first electric motor M1 to raise the engine speed $N_E$ or by increasing the opening angle $\theta_{TH}$ of the electronic throttle valve 62 in the process of the shifting control. In this case, the shifting control and the engine starting control are concurrently implemented in a broad sense, but at least the ignition by the ignition device 68 is implemented only after the completion of the shifting control.

Next, the engine starting control according to the engine control portion 86 of the engine control apparatus according to the present embodiment of this invention will be described by reference to the flow chart of FIG. 9. Initially, the affirmative determination that the shifting control is required to be implemented is obtained in step SA1, and then the affirmative determination that the engine starting control is required to be implemented is obtained in step SA2. The affirmative determination in step SA3 that the vehicle operator requires a change of the vehicle drive forced is obtained on the basis of a fact that the operation amount $A_{CC}$ of the accelerator pedal 40 is considerably increased around the point of time t0. Accordingly, the control flow goes to step SA4.

That is, the engine starting control is implemented even in the process of the shifting control, without a change of the timing of the engine starting by the engine-starting-timing changing portion 100, but with an increase of the rate of rise of the engine speed $N_E$ and/or an increase of the rate of rise of the engine torque $T_E$ by the engine-starting-method changing portion 98 according to the vehicle operator's requirement for an increase of the vehicle drive force.

Described in detail by reference to the time chart of FIG. 10, upon determination at the point of time t0 that the engine starting control is required to be implemented, the ignition value of the engine speed $N_E$ at which the ignition by the ignition device 68 is lowered from the predetermined normal value. Further, the operating speed $N_{M1}$ of the first electric motor M1 operated to implement the engine motoring or cranking is raised, to raise the engine speed $N_E$, and the opening angle $\theta_{TH}$ of the electronic throttle valve 62 is increased. As a result, the engine 8 is ignited at a point of time $t_{IG}$ at which the engine speed $N_E$ is raised to the ignition value, and is thus started. Since the ignition engine speed $N_E$ is lowered from the predetermined normal value, the engine 8 is ignited at the earlier point of time $t_{IG}$, whereby the starting of the engine 8 is expedited.

Accordingly, the time period required for an increase of the torque $T_{18}$ of the power transmitting member 18 by the output torque of the engine 8 after the determination at the point of time t0 of the requirement for acceleration of the hybrid vehicle on the basis of the depression of the accelerator pedal 40 by the vehicle operator is shorted according to the engine control apparatus of the present invention, as compared with that according to the prior art engine control apparatus. Namely, the time period from the point of time t0 to the point of time $t_{IG}$ according to the engine control apparatus of the present embodiment is shorter than the time period from the point of time t0 to the point of time $t_{IG}'$ according to the prior art engine control apparatus. That is, when the vehicle operator's requirement for a change of the vehicle drive force is detected, the vehicle drive force is rapidly changed according to the requirement.

The engine control portion 86 constructed according to the present embodiment of the invention is configured such that the timing of initiation of starting of the engine 8 is changed by the engine-starting-timing changing portion 100 according to the contents of the requirement for the engine starting control detected by the drive-force-force requirement detecting portion 92, when the engine start control and the shifting control of the automatic transmission portion 20 are concurrently required to be implemented. Accordingly, the starting control of the engine 8 is initiated at the timing according to the contents of the requirement for the engine starting control based on the intention of the vehicle operator. Accordingly, the present engine control portion 86 simplifies the shifting control and the engine starting control while assuring both an improved response to the vehicle operator's requirement for acceleration or deceleration of the hybrid vehicle, and reduction of a starting shock of the engine 8 and a shifting shock of the automatic transmission portion 20 when the acceleration or deceleration of the hybrid vehicle is not required by the vehicle operator.

The engine control portion 86 is further configured such that the starting control of the engine 8 is implemented in the process of the shifting control of the automatic transmission portion 20 when the requirement for a change of the vehicle drive force is detected by the drive-force-change requirement detecting portion 92, but one of the engine starting control and the shifting control is initiated after completion of the other control when the requirement for the change of the vehicle drive force is not detected. This arrangement permits not only an improved response to the vehicle operator's desire to change the vehicle drive force, but also reduction of the shifting shock or the engine starting shock when the vehicle operator does not desire to change the vehicle drive force.

The engine control portion 86 is further configured such that one of the shifting and engine starting controls the implementation of which is determined prior to the other is implemented prior to the other when the requirement for the change of the vehicle drive force is not detected by the drive-force-change requirement detecting portion 92. Accordingly, one of the shifting control and the engine starting controls is not concurrently implemented during the other control, making it possible to prevent deterioration of the shifting or engine starting shock.

The present engine control portion 86 is arranged such that The engine control portion 86 constructed according to the present embodiment of the invention is configured such that the method of starting of the engine 8 is changed by the engine-starting-method changing portion 98 according to the contents of the requirement for the engine starting control detected by the drive-force-force requirement detecting portion 92, when the engine start control and the shifting control of the automatic transmission portion 20 are concurrently required to be implemented. Accordingly, the starting control of the engine 8 is implemented by the method according to the contents of the requirement for the engine starting control based on the intention of the vehicle operator. Accordingly, the present engine control portion 86 simplifies the shifting control and the engine starting control while assuring both an improved response to the vehicle operator's requirement for acceleration or deceleration of the hybrid vehicle, and reduction of a starting shock of the engine 8 and a shifting shock of the automatic transmission portion 20 when the acceleration or deceleration of the hybrid vehicle is not required by the vehicle operator.

The engine control portion 86 is further configured such that the rate of rise of the operating speed of the engine and/or the rate of rise of the torque of the engine is/are made higher when the requirement for a change of the vehicle drive force is detected by the drive-force-change requirement detecting portion 92 than when the requirement for the change of the vehicle drive force is not detected. This arrangement permits an improved response to the vehicle operator's desire to change the vehicle drive force.

The engine control portion 86 is arranged such that the starting control of the engine 8 is implemented by the engine-starting-timing changing portion 100, prior to completion of the shifting control of the automatic transmission portion 20. That is, the engine 8 is started in the process of the shifting control of the automatic transmission portion 20, so that the response to the intention of the vehicle operator to change the vehicle drive force is improved.

The engine control portion 86 is further arranged such that the rate of rise of the engine speed $N_E$ and/or the rate of rise of the engine torque $T_E$ is/are increased by the engine-starting-method changing portion 98 by advancing the ignition timing of the engine 8, that is, by lowering the engine speed $N_E$ at which the engine 8 is ignited, so that the response to the intention of the vehicle operator to change the vehicle drive force is improved.

The engine control portion 86 is further arranged such that the rate of rise of the engine speed $N_E$ and/or the rate of rise of the engine torque $T_E$ is/are increased by the engine-starting-method changing portion 98, by increasing the intake air quantity of the engine, that is, by increasing the opening angle $\theta_{TH}$ of the electronic throttle valve 62, so that the response to the intention of the vehicle operator to change the vehicle drive force is improved.

The engine control portion 86 is further arranged such that the rate of rise of the engine speed $N_E$ and/or the rate of rise of the engine torque $T_E$ is/are increased by increasing the rate of rise of the operating speed $N_{M1}$ of the first electric motor M1, so that the response to the intention of the vehicle operator to change the vehicle drive force is improved.

In the illustrated vehicle drive system including the transmission mechanism 10, the differential state between the rotating speed $N_{IN}$ of the input shaft 14 and the rotating speed $N_{18}$ of the output shaft 18 of the electrically controlled differential portion 11 is controlled by controlling the operating state of the first electric motor M1 connected to a rotary element in the form of the first sun gear S1 of the first planetary gear set 24 of the power distributing mechanism 16 of the differential portion 11. Accordingly, the rate of rise of the operating speed $N_E$ of the engine 8 and/or the rate of rise of the torque $T_E$ of the engine 8 can be increased by controlling the first electric motor M1 connected to the first sun gear S1 of the power distributing mechanism 16.

In the illustrated vehicle drive system, the power distributing mechanism 16 of the differential portion 11 includes the first planetary gear set 24 having a rotary element in the form of the first carrier CA1 connected to the engine 8, and another rotary element in the form of the first sun gear S1 connected to the first electric motor M1, and the operating speed $N_E$ of the engine 8 is raised by the electric motor M1. Since the engine 8 can be operated by the first electric motor M1 through the first planetary gear set 24, the drive system does not require an electric motor provided exclusively for starting the engine 8.

The drive-force-change requirement detecting portion 92 includes the acceleration requirement detecting portion 94 configured to detect the requirement for acceleration of the hybrid vehicle, as the requirement for a change of the vehicle drive force. Accordingly, the starting control of the engine 8 is initiated at the timing according to the intention of the vehicle operator to accelerate the hybrid vehicle, or implemented by a method according to this intention.

The drive-force-change requirement detecting portion 92 further includes the deceleration requirement detecting portion 96 configured to detect the requirement for deceleration of the hybrid vehicle, as the requirement for a change of the vehicle drive force. Accordingly, the starting control of the engine 8 is initiated at the timing according to the intention of the vehicle operator to decelerate the hybrid vehicle, or implemented by a method according to this intention.

The engine control portion 86 includes the engine starting portion 88 configured to initiate a rotary motion of the engine for starting the engine 8 when the requirement for deceleration of the vehicle is detected. Accordingly, the engine 8 can be started by initiating the rotary motion of the engine 8 when the vehicle operator requires deceleration of the hybrid vehicle.

The illustrated transmission mechanism 10 is provided with the manually operable shifting device 50, and the deceleration detecting portion 96 detects the requirement for deceleration of the vehicle when the shift lever 52 of the shifting device 50 is operated by the vehicle operator to shift down the automatic transmission portion 20. Accordingly, the intention of the vehicle operator to decelerate the vehicle can be easily detected.

The illustrated drive system including the transmission mechanism 10 is provided with the manually operable brake operating member in the form of the brake pedal 42 for braking the hybrid vehicle, and the deceleration detecting portion 96 detects the requirement for deceleration of the vehicle when the brake pedal 42 is operated by the vehicle operator to brake the hybrid vehicle. Accordingly, the intention of the vehicle operator to decelerate the hybrid vehicle can be easily detected.

The hybrid vehicle is provided with the towing switch 44 which is turned to change the control mode of the drive system including the transmission mechanism 10, when the hybrid vehicle runs to tow another vehicle, and the deceleration detecting portion 96 detects the requirement for deceleration of the vehicle is detected when the towing switch 44 is placed in the on state. Accordingly, the intension of the vehicle operator to decelerate the vehicle can be easily detected.

Referring next to FIGS. 11-15, a second embodiment of this invention will be described. In this second embodiment, the same reference signs as used in the first embodiment will be used to identify the corresponding elements.

Figure 11:
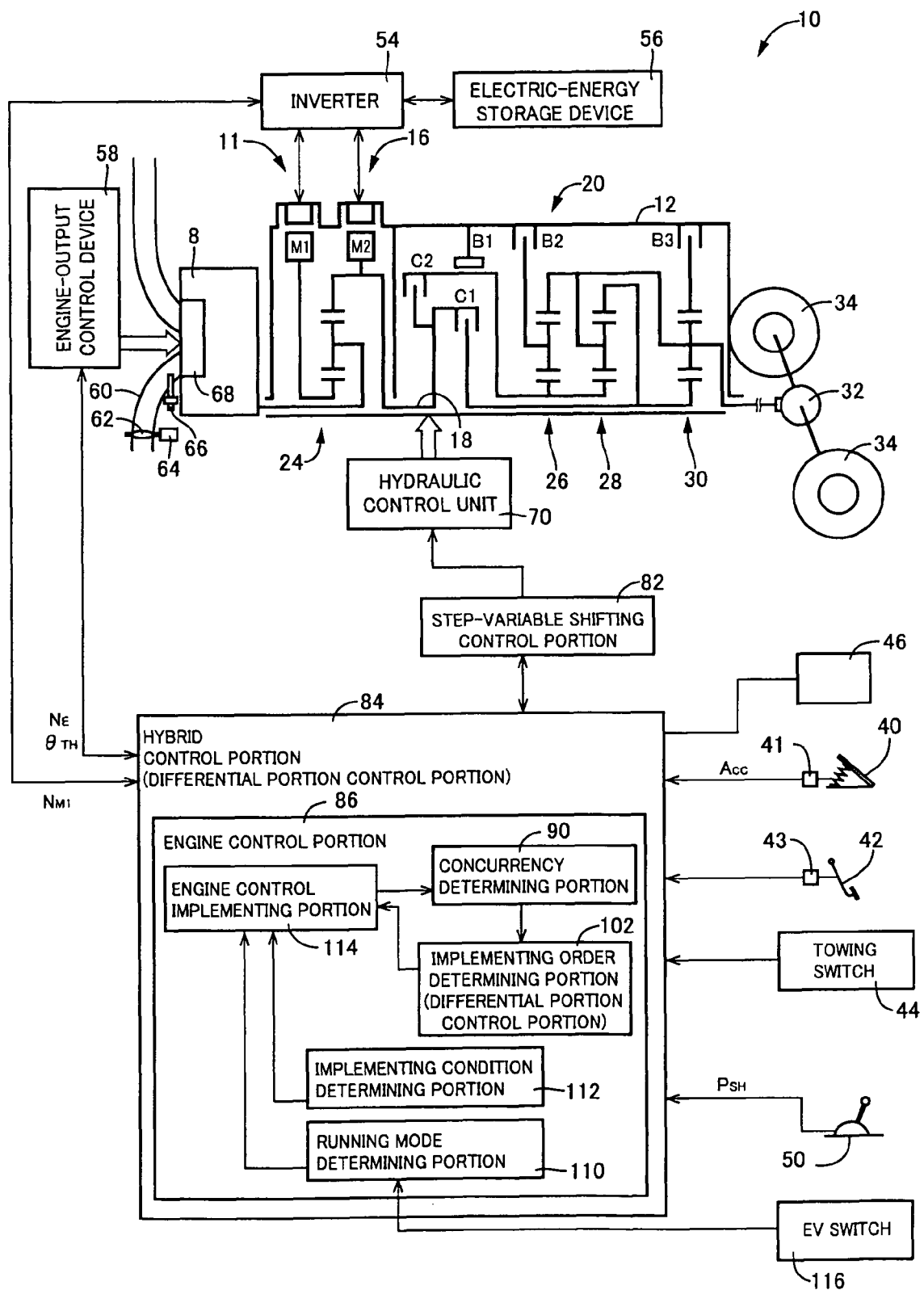
FIG. 11 is a functional block diagram corresponding to that of FIG. 7, illustrating major control functions of the electronic control device of FIG. 4 serving as an engine control apparatus constructed according to a second embodiment of this invention.

The functional block diagram of FIG. 11, which corresponds to that of FIG. 7, shows major control functions of the electronic control device 80 constructed according to the second embodiment. In the present second embodiment, the engine control portion 86 of the hybrid control portion 84 includes the concurrency determining portion 90 and implementing order determining portion 102 described above with respect to the first embodiment, and a running mode determining portion 110, an implementing condition determining portion 112 and an engine control implementing portion 114.

In the motor drive mode of the hybrid vehicle, the engine 8 is held stationary in principle under the control of the hybrid control portion 84, so that the components of the engine 8 are held in a non-lubricated state, without motions of the components. In this state, vibrations of the hybrid vehicle running in the motor drive mode are transferred to the engine 8 held in the stationary state, giving rise to a risk of deterioration of durability of the engine 8. In view of this risk, the engine 8 is controlled to reduce a risk of an adverse influence of the vehicle vibration in the motor drive mode on the durability of the engine 8, as described below in detail.

The running mode determining portion 110 is configured to determine whether the hybrid vehicle is running in the motor drive mode, with the second electric motor M2 operated as the drive power source, while the engine 8 is held in the non-operated state. The running mode determining portion 110 determines that the vehicle is running in the mode drive mode when an EV switch 116 (shown in FIG. 11) is placed in the on state, even while the vehicle running condition lies in the engine drive region indicated in FIG. 8. The EV switch 116 is operated by the vehicle operator when the vehicle operator desires to establish the motor drive mode. During running of the vehicle with the engine 8, the running mode determining portion 110 does not determine that the vehicle is running in the motor drive mode.

The implementing condition determining portion 112 is configured to determine whether a continuous running distance $L_M$ of the hybrid vehicle in the motor drive mode has exceeded a predetermined upper limit L1. The continuous running distance $L_M$ is a cumulative distance of running of the hybrid vehicle in the motor drive mode, with continuous operation or intermittent operations of the second electric motor M2, until the motor drive mode is changed to the engine drive mode with initiation of the rotary motion of the output shaft 49 of the engine 8. The continuous running distance $L_M$ is reset to zero when the rotary motion of the output shaft of the engine 8 is initiated. The upper limit L1 of the continuous running distance $L_M$ is obtained by experimentation, as a threshold value above which the engine 8 should be operated to avoid the deterioration of its durability due to an excessively long period of time of its stationary state. The thus obtained upper limit L1, which is 20 km, for example, is stored in the implementing condition determining portion 112.

The implementing condition determining portion 112 is alternatively or further configured to determine whether a continuous running time $T_M$ of the hybrid vehicle in the motor drive mode has exceeded a predetermined upper limit T1. That is, the implementing condition determining portion 112 is configured to make the determination as to whether the continuous running distance $L_M$ has exceeded the upper limit L1, and/or the determination as to whether the continuous running time $T_M$ has exceeded the upper limit T1. The continuous running time $T_M$ is a cumulative time of running of the hybrid vehicle in the motor drive mode, with continuous operation or intermittent operations of the second electric motor M2, until the motor drive mode is changed to the engine drive mode with initiation of the rotary motion of the output shaft 49 of the engine 8. The continuous running time $T_M$ is reset to zero when the rotary motion of the output shaft of the engine 8 is initiated. The upper limit T1 of the continuous running time $T_M$ is obtained by experimentation, as a threshold value above which the engine 8 should be operated to avoid the deterioration of its durability due to an excessively long period of time of its stationary state. The thus obtained upper limit T1, which is 1.5 hours, for example, is stored in the implementing condition determining portion 112.

The implementing condition determining portion 112 is alternatively or further configured to determine whether the vehicle running speed V has exceeded a predetermined upper limit V1. That is, the implementing condition determining portion 112 is configured to make at least one of the determination as to whether the continuous running distance $L_M$ has exceeded the upper limit L1, the determination as to whether the continuous running time $T_M$ has exceeded the upper limit T1, and the determination as to whether the vehicle speed V has exceeded the upper limit V1. Generally, the magnitude of the vehicle running vibrations tends to increase with a rise of the vehicle speed V, and the adverse influence of the running vibrations on the durability of the vehicle increases with the rise of the vehicle speed. The upper limit V1 of the vehicle running speed V is obtained by experimentation, as a threshold value above which the engine 8 should be operated to avoid the deterioration of its durability. The thus obtained upper limit V1, which is 100 km/h, for example, is stored in the implementing condition determining portion 112.

Where the running mode determining portion 110 determines that the vehicle is running in the motor drive mode, the engine control implementing portion 114 initiates a control of the engine 8, more specifically a rotary motion of the output shaft 49, if the implementing condition determining portion 112 has obtained at least one of the affirmative determination that the continuous running distance $L_M$ has exceeded the upper limit L1, the affirmative determination that the continuous running time $T_M$ has exceeded the upper limit, and the affirmative determination that the vehicle speed V has exceeded the upper limit V. Described in detail, the engine control implementing portion 114 raises the operating speed $N_{M1}$ of the first electric motor M1 in the direction of operation of the second electric motor M2, to raise the operating speed $N_E$ of the engine 8 (rotating speed of the output shaft 49) to a predetermined target value $N_{E1}$, for instance, 400 rpm, and to hold the engine speed $N_E$ at the target value $N_{E1}$ for a predetermined time $T_{E1}$, for instance, two seconds, without an ignition of the engine 8. After the engine speed $N_E$ is held at the target value $N_{E1}$ for the predetermined time $T_{E1}$, the above-indicated continuous running distance $L_M$ and the continuous running time $T_M$ are reset to zero. The target engine speed $N_{E1}$ and the predetermined time $T_{E1}$ are desirably as low or short as possible to improve the fuel economy of the vehicle, to the extent permitting lubrication of the engine 8 to improve the durability of the engine 8. For reducing the vibration during rotation of the output shaft 49 of the engine 8, the target engine speed $N_{E1}$ is determined to be lower than a resonance value of the engine 8. It is also noted that difficulty of lubrication of the engine 8 increases with a decrease of the temperature of the lubricant used for the engine 8, and therefore with an increase of the viscosity of the lubricant. In this respect, the target speed $N_{E1}$ of the rotating speed of the output shaft 49 of the engine 8 controlled by the engine control implementing portion 114 is preferably determined to increase with a decrease of the operating temperature of the engine 8, more specifically, the temperature of the lubricant for the engine 8, that is, with a decrease of the ambient temperature. The predetermined time $T_{E1}$ during which the engine speed $N_E$ is held at the target value NE1 is preferably determined to increase with a decrease of the operating temperature of the engine 8, that is, with a decrease of the ambient temperature. In this second embodiment, the control to hold the engine speed NE at the target value $N_{E1}$ for the predetermined time $T_{E1}$ corresponds to the control of the engine 8 implemented by the engine control portion 86.

The time chart of FIG. 14 explains an example of the control of the engine 8 by the engine control apparatus including the engine control portion 86 implemented according to the second embodiment of the invention when the continuous running distance $L_M$ of the hybrid vehicle in the motor drive mode has exceeded the upper limit L1.

At a point of time $T_{A1}$ indicated in FIG. 14, the running mode determining portion 110 determines that the hybrid vehicle is running in the motor drive mode, and when the implementing condition determining portion 112 determines that the continuous running distance $L_M$ of the hybrid vehicle in the motor drive mode has exceeded the upper limit L1, and therefore determines that the control of the engine 8 should be implemented to prevent deterioration of durability of the engine 8.

At a point of time $T_{A2}$ in FIG. 14, the control of the engine 8 is initiated by the engine control implementing portion 3. Namely, the rise of the first electric motor speed $N_{M1}$ is initiated at this point of time $T_{A2}$, so that the engine speed $N_E$ is raised to the target value $N_{E1}$, with a rise of the first electric motor speed $N_{M1}$, owing to the differential function of the power distributing mechanism 16.

At a point of time $T_{A3}$ in FIG. 14, the control of the engine 8 by the engine control implementing portion 114 is completed, with de-energization of the first electric motor M1 to place the first electric motor M1 in a freely rotatable state. The engine speed $N_E$ is lowered from the target value $N_{E1}$ to zero at the point of time $T_{A3}$, due to a resistance to the rotary motion of the engine 8. At the point of time $T_{A3}$ at which the engine speed NE has been zeroed, the first electric motor M1 is restored to its state rotating in the direction opposite to the direction of operation of the second electric motor M2 driving the hybrid vehicle, by the second electric motor M2 and the differential function of the power distributing mechanism 16. The continuous running distance $L_M$ of the hybrid vehicle in the motor drive mode is reset to zero at the point of time $T_{A3}$, since the rotary motion of the output shaft 49 of the engine 8 was initiated at the point of time $T_{A2}$ under the control of the engine control implementing portion 114. For the same reason, the continuous running time $T_M$ of the hybrid vehicle in the motor drive mode is also reset to zero at the point of time $T_{A3}$, although this resetting of the continuous running time $T_M$ is not indicated in the time chart of FIG. 14. It is noted that the predetermined time TN1 is a time period from the point of time $T_{A2}$ to the point of time $T_{A3}$ during which the engine speed $N_E$ is held at the target value $N_{E1}$.

If the shifting control of the automatic transmission portion 20 under the control of the step-variable shifting control portion 82 and the control of the engine 8 under the control of the engine control implementing portion 114 are implemented concurrently, the output torque of the differential portion 111 varies due to a variation of the first electric motor speed NM1 during its operation to rotate the output shaft 49 of the engine 8, so that it is difficult to establish a torque balance of the coupling elements (rotary elements) of the automatic transmission portion 20, giving rise to a risk of deterioration of the shifting shock of the automatic transmission portion 20.

In the hybrid vehicle drive system including the transmission mechanism 10, the second electric motor M2 connected to the first planetary gear set 24 is controlled to generate a reaction torque for preventing its dragging by the first electric motor M1 operated to rotate the output shaft 49 of the engine 8 under the control of the engine control implementing portion 114. In the process of the shifting control of the automatic transmission portion 20, that is, in a partially or imperfectly shifted state of the automatic transmission portion 20 in which the appropriate gear position has not been established, the output shaft 22 of the automatic transmission portion 20 does not enable the ring gear R1 of the first planetary gear set 24 to have a sufficiently large torque, making it difficult to establish a torque balance of the coupling elements (rotary elements) of the automatic transmission portion 20 while controlling the operating speed $N_E$ of the engine 8 in the process of the engine control, leading to increased complexity of the engine control and deterioration of a control shock of the engine 8 and the shifting shock of the automatic transmission portion 20.

To avoid this drawback, the engine control portion 86 according to the second embodiment includes the concurrency determining portion 90 and implementing order determining portion 102, which have been described above with respect to the first embodiment. As described above, the concurrency determining portion 90 is configured to determine whether the step-variable shifting control portion 82 and the engine control implementing portion 114 concurrently determine that the shifting control of the automatic transmission portion 20 and the control of the engine 8 are required to be implemented, in other words, whether the shifting control and the engine control take place concurrently according to the determinations by the step-variable shifting control portion 82 and the engine control implementing portion 114. For instance, the concurrency determining portion 90 determines from time to time during one of the shifting control and the engine starting control, whether the other of the two controls should be initiated during the above-indicated one control.

The implementing order determining portion 102 functions as the step-variable shifting inhibiting portion or the engine-control inhibiting portion, and is configured to inhibit one of the shifting control and engine control until the other control is completed or terminated, when the concurrency determining portion 90 determines that the shifting control and the engine control are concurrently required to be implemented. For example, upon determination by the concurrency determining portion 90 that the shifting control and the engine control are concurrently required to be implemented, the implementing order determining portion 102 first enables the step-variable shifting control portion 82 to initiate the shifting control, and then enables the engine control implementing portion 114 to initiate the engine control after completion of the shifting control. In this case, the shifting control is initiated prior to the engine control, according to the intention of the vehicle operator. Thus, the timing of initiation of the engine control is changed such that the engine control is initiated after completion of the shifting control.

Figure 12:
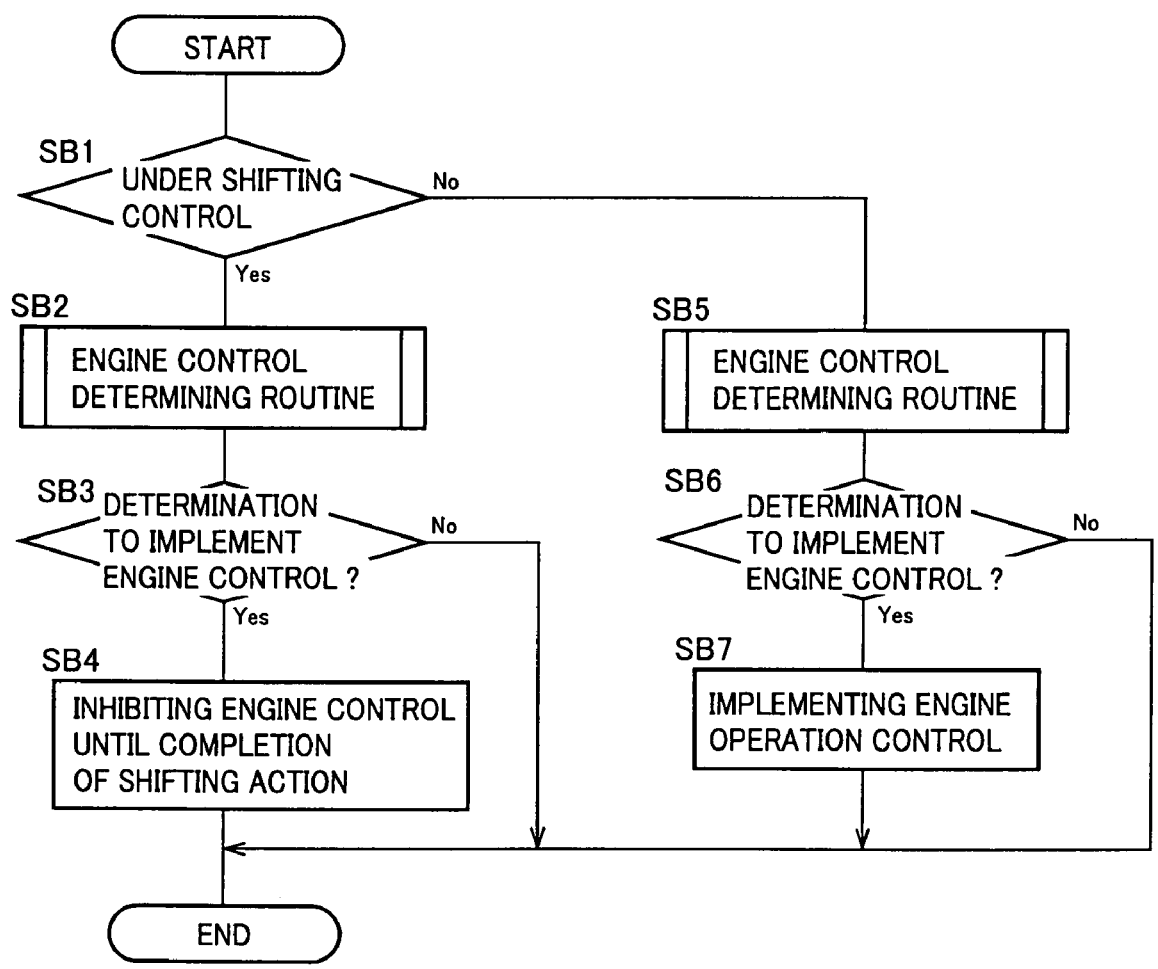
FIG. 12 is a flow chart corresponding to that of FIG. 9, illustrating an engine control routine executed by the electronic control device of the second embodiment.

Referring to the flow chart of FIG. 12 corresponding to that of FIG. 9, there is illustrated a control routine executed by the engine control apparatus including the engine control portion 86 according to the second embodiment of the invention. This control routine includes steps SB1, SB3 and SB6 which correspond to the concurrency determining portion 90. The control routine is initiated with step SB1 to determine whether the shifting control of the automatic transmission portion 20 by the step-variable shifting control portion 82 is being implemented. When an affirmative determination is obtained in step SB1, the control flow goes to step SB2. If a negative determination is obtained in step SB1, the control flow goes to step SB5. The affirmative determination is obtained in step SB1 during a time period between a moment of determination that the shifting control of the automatic transmission portion 20 should be implemented by the step-variable shifting control portion 82 and a moment of termination of the inertia phase of the appropriate shifting action of the automatic transmission portion 20.

Figure 13:
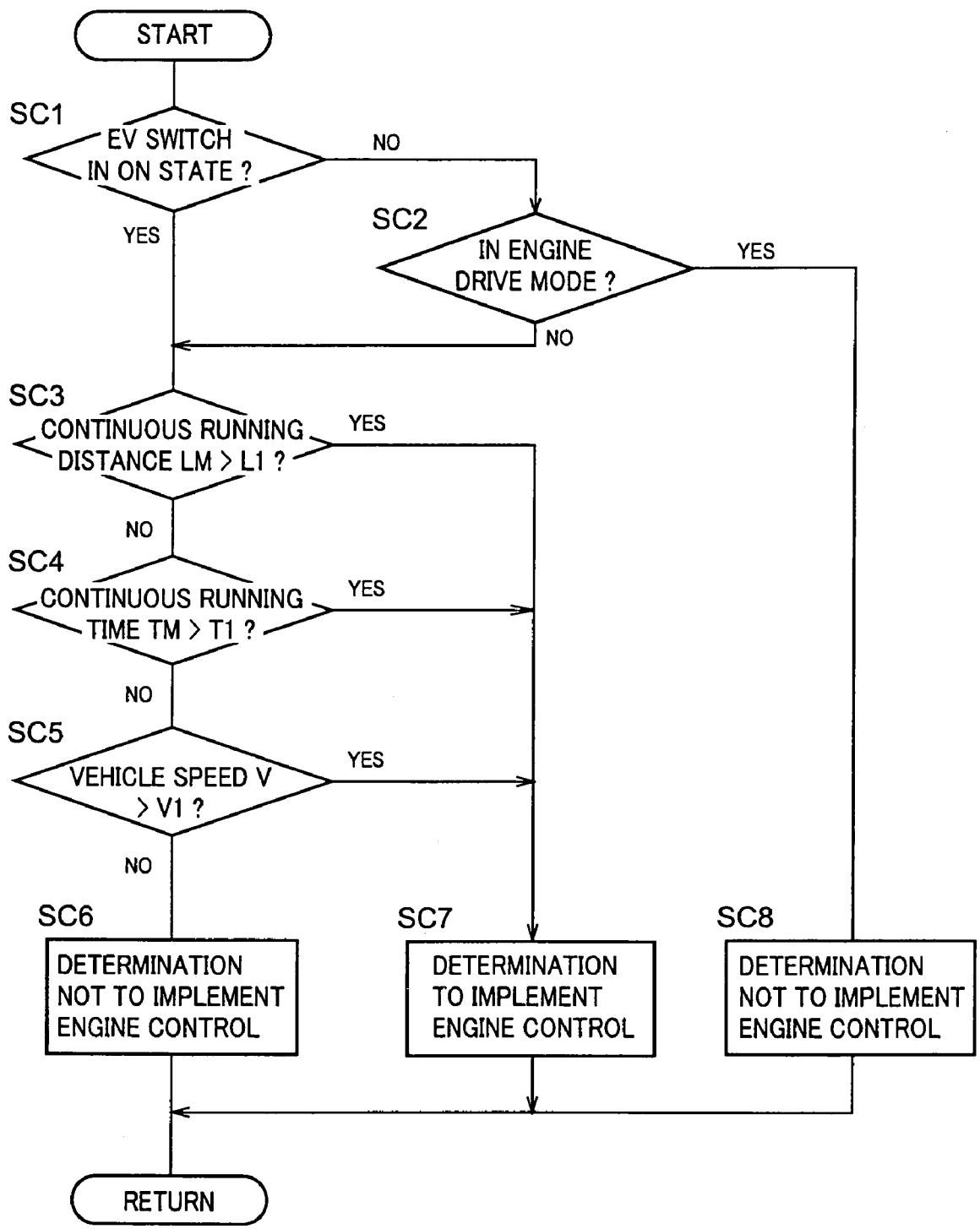
FIG. 13 is a flow chart illustrating an engine control determining routine executed in the engine control routine of the flow chart of FIG. 13.

Step SB2 is provided to implement an engine control determining routine for determining whether the control of the engine 8 should be implemented. The flow chart of FIG. 13 illustrated an example of the engine control determining routine, which is initiated with step SC1 to determine whether the EV switch 116 is placed in the on state during running of the hybrid vehicle, that is, whether the motor drive mode is selected by a signal generated by the EV switch 116 operated by the hybrid vehicle operator. When an affirmative determination is obtained in step SC1, that is, when the hybrid vehicle is running in the motor drive mode with the EV switch 116 placed in the on state, the control flow goes to step SC3. If a negative determination is obtained in step SC1, the control flow goes to step SC2, Step SC2 is provided to determine whether the hybrid vehicle is running in the engine drive mode. When an affirmative determination is obtained in step SC2, that is, when the hybrid vehicle is running in the engine drive mode, the control flow goes to step SC8. When a negative determination is obtained in step SC2, the control flow goes to step SC3. It will be understood that steps SC1 and SC2 correspond to the running mode determining portion 110.

Step SC3 is provided to determine whether the continuous running distance $L_M$ of the hybrid vehicle in the motor drive mode has exceeded the predetermined upper limit L1. For example, the continuous running distance $L_M$ is obtained on the basis of the number of rotations of the output shaft 22 of the transmission mechanism 10, which can be detected by the vehicle speed sensor 46 (shown in FIG. 4). When an affirmative determination is obtained in step SC3, that is, when the continuous running distance $L_M$ has exceeded the upper limit L1, the control flow goes to step SC7. When a negative determination is obtained in step SC3, the control flow goes to step SC4. As described above, the continuous running distance $L_M$ is the cumulative distance of running of the hybrid vehicle in the motor drive mode, with continuous operation or intermittent operations of the second electric motor M2, until the motor drive mode is changed to the engine drive mode with initiation of the rotary motion of the output shaft 49 of the engine 8. The continuous running distance $L_M$ is reset to zero when the rotary motion of the output shaft 49 of the engine 8 is initiated.

Step SC4 is provided to determine whether the continuous running time $T_M$ of the hybrid vehicle in the motor drive mode has exceeded the upper limit T1. When an affirmative determination is obtained in step SC4, that is, when the continuous running time $T_M$ has exceeded the upper limit T1, the control flow goes to step SC7. When a negative determination is obtained in step SC4, the control flow goes to step S5. As described above, the continuous running time $T_M$ is the cumulative time of running of the hybrid vehicle in the motor drive mode, with continuous operation or intermittent operations of the second electric motor M2, until the motor drive mode is changed to the engine drive mode with initiation of the rotary motion of the output shaft 49 of the engine 8. The continuous running time $T_M$ is reset to zero when the rotary motion of the output shaft 14 of the engine 8 is initiated.

Step SC5 is provided to determine whether the vehicle running speed V has exceeded the upper limit V1. When an affirmative determination is obtained in step SC5, that is, when the vehicle running speed V has exceeded the upper limit V1, the control flow goes to step SC7. When a negative determination is obtained in step SC5, the control flow goes to step S6. It will be understood that steps SC3, SC4 and SC5 correspond to the implementing condition determining portion 112.

Steps SC6, SC7 and SC8 are provided to determine whether the engine control to control the first electric motor M1 for rotating the output shaft 49 of the engine 8 should be implemented or not. That is, the determination not to implement the engine control is made in step SC6, namely, where any one of the three conditions for implementing the engine control is not satisfied even during running of the hybrid vehicle in the motor drive mode (even when the affirmative determination is obtained in step SC1), and in step SC8, namely, where the hybrid vehicle is not running in the motor drive mode but running in the engine drive mode (when the negative determination is obtained in step SC1 and when the affirmative determination is obtained in step SC2). Where any one of the three conditions for implementing the engine control is satisfied (where the affirmative determination is obtained in one of steps SC3-SC5) while the hybrid vehicle is running in the motor drive mode, the determination to implement the engine control is implemented in step SC7. This step SC7 corresponds to the engine control implementing portion 114.

Referring back to the flow chart of FIG. 12, step SB2 (engine control determining routine of FIG. 13) is followed by step SB3 to determine whether the determination to implement the engine control has been obtained in the engine control determining routine in step SB2. When an affirmative determination is obtained in step SB3, that is, when the determination to implement the engine control has been obtained, the control flow goes to step SB4. When a negative determination is obtained in step SB3, that is, when the determination not to implement the engine control has been obtained in step SB2, one cycle of execution of the engine control routine of FIG. 12 is terminated, without implementation of the engine control.

Step SB4, which corresponds to the implementing order determining portion 102, is implemented when the shifting control of the automatic transmission portion 20 and the control of the engine 8 are concurrently required to be implemented. In step SB4, the control of the engine 8 to raise its output speed is implemented only after completion of the shifting control (after detection of completion of the appropriate shifting action of the automatic transmission portion 20). That is, the implementation of the engine control is inhibited until the shifting action is completed.

Steps SB5, SB6 and SB7 are implemented when a negative determination is obtained in step SB1, that is, implemented when the automatic transmission portion 20 is not in the process of a shifting action under the control of the step-variable shifting control portion 82. Step SB5 identical with step SB2 described above is implemented to execute the engine control determining routine to determine whether the engine control should be implemented or not. Step SB5 is followed by step SB6 to determine whether the determination to implement the engine control has been obtained in step SB5. When an affirmative determination is obtained in step SB6, that is, when the determination to implement the engine control has been obtained, the control flow goes to step SB7. When a negative determination is obtained in step SB6, that is, when the determination not to implement the engine control, one cycle of execution of the engine control routine of FIG. 12 is terminated, without implementation of both the engine control and the shifting control.

Step SB7 is implemented when the affirmative determination is obtained in step SB6, that is, where the determination to implement the engine control is made while the automatic transmission portion 20 is not in the process of the shifting action. In this step SB7, the engine control is implemented according to the determination in step SB5 to implement the engine control, since the engine control is not required to be implemented concurrently with the shifting control of the automatic transmission portion 20.

The engine control portion 86 constructed according to the present second embodiment of the invention is configured such that the control of the engine 8 to rotate its output shaft 49 is implemented when the distance $L_M$ of continuous running of the hybrid vehicle with the electric motor M1, M2 operatively connected to the vehicle drive wheels 34 of the transmission mechanism 10 while the engine 8 is held at rest has exceeded the upper limit L1. One of the control of the engine 8 to rotate its output shaft 49 when the continuous running distance $L_M$ has exceeded the upper limit L1 and the shifting control of the automatic transmission portion 20 is initiated after completion of the other of the engine control and the shifting control, where these two controls are concurrently required to be implemented. Accordingly, one of the engine control to rotate the engine output shaft 49 and the shifting control is not implemented in the process of the other of the engine control and shifting control, making it possible to prevent deterioration of the shifting shock and the shock due to the engine control.

The engine control portion 86 according to the second embodiment is further configured such that the control of the engine 8 to rotate its output shaft 49 is implemented when the time $T_M$ of continuous running of the hybrid vehicle with the electric motor M1, M2 operatively connected to the vehicle drive wheels 34 of the transmission mechanism 10 while the engine 8 is held at rest has exceeded the upper limit L1. One of the control of the engine 8 to rotate its output shaft 49 when the continuous running time $T_M$ has exceeded the upper limit T1 and the shifting control of the automatic transmission portion 20 is initiated after completion of the other of the engine control and the shifting control, where these two controls are concurrently required to be implemented. Accordingly, one of the engine control to rotate the engine output shaft 49 and the shifting control is not implemented in the process of the other of the engine control and shifting control, making it possible to prevent deterioration of the shifting shock and the shock due to the engine control.

The engine control portion 86 according to the second embodiment is further configured such that the control of the engine 8 to rotate its output shaft 49 is implemented when the running speed V of the hybrid vehicle running with the electric motor M1, M2 operatively connected to the vehicle drive wheels 34 of the transmission mechanism 10 while the engine 8 is held at rest has exceeded the upper limit V1. One of the control of the engine 8 to rotate its output shaft 49 when the running speed V has exceeded the upper limit V1 and the shifting control of the automatic transmission portion 20 is initiated after completion of the other of the engine control and the shifting control, where these two controls are concurrently required to be implemented. Accordingly, one of the engine control to rotate the engine output shaft 49 and the shifting control is not implemented in the process of the other of the engine control and shifting control, making it possible to prevent deterioration of the shifting shock and the shock due to the engine control.

The engine control portion 86 according to the second embodiment is arranged such that the control of the engine 8 to rotate its output shaft 49 when the above-indicated upper limit L1, T1, V1 of the continuous running distance $L_M$ or time $T_M$ or running speed V has been reached while the control of the engine 8 and the shifting control of the automatic transmission portion 20 are concurrently required to be implemented is implemented after completion of the shifting control, such that the control of the engine 8 is implemented without an intension of the vehicle operator to implement this control of the engine 8. This arrangement is not only effective to prevent deterioration of the shifting shock and the shock due to the engine control, but also permits simplification of control to reduce the shocks.

While the preferred embodiments of this invention have been described in detail by reference to the accompanying drawings, it is to be understood that the present invention may be otherwise embodied.

In the first embodiment, a special shifting boundary line map suitable for running of the hybrid vehicle in the towing mode is selected in place of the ordinary shifting boundary line map of FIG. 8, when the towing switch 44 is placed in the on state. However, the towing mode is not limited to the selection of the special shifting boundary line map.

The engine-starting-method changing portion 98 in the first embodiment is configured to advance the timing of starting of the engine 8 by igniting the engine 8 at a relatively low speed of the engine 8. In the example of FIG. 10, the starting control of the engine 8 is completed prior to the moment of substantial initiation of a shifting action of the automatic transmission portion 20 under the shifting control, more specifically, prior to the moment of entry of a torque phase of the shifting action, for example. However, the timing of starting of the engine 8 is not limited to that described above. Where the starting control of the engine 8 can be completed prior to the moment of substantial initiation of the shifting action of the automatic transmission portion 20, as in the example of FIG. 10, the input torque of the automatic transmission portion 20, that is, the torque of the power transmitting member 18 upon initiation of the shifting control is less likely to be influenced by a torque variation due to the starting of the engine 8, resulting in an advantage of simplification of the control for reducing the shifting shock of the automatic transmission portion 20.

In the control routine of FIG. 9, the step SA2 is formulated to make the determination as to whether the starting control of the engine 8 is required to be implemented, during the shifting control of the automatic transmission portion 20. However, the step SA2 may be modified to determine whether the engine 8 has been started on the basis of the determination that the engine starting control is required to be implemented. In this case, the determination as to whether the engine starting control and the shifting control are concurrently required to be implemented is made by determining whether the engine 8 has been started after initiation of the shifting control.

In the illustrated embodiments, the shifting device 50 is placed in one of the position "1" through "4" corresponding to the respective groups of the gear positions of the automatic transmission portion 20, when the shift lever 52 is placed in the manual forward-drive position "M". However, the positions selectable in the manual forward-drive position "M" of the shift lever 52 are not limited to the positions "1" through "4", but may be any other positions corresponding to respective groups of the gear positions of the automatic transmission portion 20, provided the selection of one of those positions by operating the shift lever 50 to the manual forward-drive position "M" results in manual shift-down action of the automatic transmission portion 20.

In the first embodiment, the engine-starting-method changing portion 98 (SA4) is configured to advance the timing of starting of the engine 8 by increasing the rate of rise of the operating speed of the first electric motor M1, or the rate of increase of the intake air quantity of the engine 8 by increasing the opening angle $\theta_{TH}$ of the electronic throttle valve 62. In this case, the engine-starting-timing changing portion 100 is further configured to ignite the engine 8 at the lower speed of the engine 8, to advance the timing of starting of the engine 8. However, the advancement of the timing of the engine starting need not be implemented by both the increase of the rate of rise of the operating speed of the first electric motor M1 or the rate of increase of the intake air quantity, and the ignition of the engine 8 at the lower speed, but may be implemented by either one of these two controls.

In the illustrated transmission mechanism 10, the differential portion 11 is operable as a continuously-variable transmission. However, this differential portion 11 may be replaced by a step-variable transmission having a plurality of fixed speed ratios.

In the illustrated transmission mechanism 10, the differential portion 11 and the automatic transmission portion 20 are connected in series with each other so that the output of the drive power source in the form of the engine 8 is transmitted to the automatic transmission portion 20 through the differential portion 11. However, the automatic transmission portion 20 may be interposed between the engine 8 and the differential portion 11 so that the output of the engine 8 is transmitted to the differential portion 11 through the automatic transmission portion 20.

In the illustrated transmission mechanism 10 constituting a part of the hybrid vehicle drive system, the differential portion 11 and the automatic transmission portion 20 are connected in series to each other through the power transmitting member 18. However, the control apparatus according to the present invention is equally applicable to a vehicular drive system in which an electrically controlled differential portion and a step-variable transmission portion are not mechanically independent of each other, provided the vehicular drive system as a whole has an electric differential function, and a shifting function different from the electric differential function.

For example, the control apparatus of the present invention is applicable to a vehicular drive system which includes two planetary gear sets connected to each other and in which an internal combustion engine, an electric motor and drive wheels are operatively connected to respective rotary elements of the planetary gear sets, such that the power transmitting system is switchable between a step-variable shifting state and a continuously-variable shifting state, by controlling clutches and brakes connected to respective rotary elements of the planetary gear sets.

While the illustrated transmission mechanism 10 uses the single-pinion type planetary gear sets, the transmission mechanism may use double-pinion type planetary gear sets.

In the illustrated first embodiment, the timing of initiation of the control of the engine 8 is changed when the starting control of the engine 8 and the shifting control of the automatic transmission portion 20 are concurrently required to be implemented as a result of a requirement of the vehicle operator to accelerate the hybrid vehicle. However, the timing of initiation of the control of the engine 8 may be changed when a stopping control of the engine 8 and the shifting control of the automatic transmission portion 20 are concurrently required to be implemented as a result of a requirement of the vehicle operator to decelerate the hybrid vehicle. Described in detail, the engine-starting-method changing portion 98 and the implementing order determining portion 102 may be configured such that the stopping control of the engine 8 is initiated at an earlier point of time when the vehicle operator's requirement for changing the vehicle drive force is detected in step SA3 while the engine stopping control and the shifting control are concurrently required to be implemented (while the affirmative determinations are obtained in steps SA1 and SA2), than when the vehicle operator's requirement for changing the vehicle drive force is not detected (when the negative determination is obtained in step SA3). That is, the stopping control of the engine 8 is initiated only after completion of the shifting control of the automatic transmission portion 20 when the requirement for a change of the vehicle drive force is not detected by the drive-force-change requirement detecting portion 92, and is initiated in the process of the shifting control when the requirement for the change of the vehicle drive force is detected by the drive-force-change requirement detecting portion 92. This arrangement not only improves the response to the vehicle operator's requirement for the change of the vehicle drive force, but also reduces the shifting shock and the engine stopping shock when the vehicle operator does not require the change of the vehicle drive force.

In the illustrated transmission mechanism 10, the power distributing mechanism 16 of the differential portion 11 is constituted principally by the first planetary gear set 24 of single-pinion type. However, the power distributing mechanism 16 may be provided with a switching brake B0 between the sun gear S0 of the first planetary gear set 24 and the casing 12, and a switching clutch C0 between the sun gear S0 and the carrier CA0. In this case, the power distributing mechanism 16 is placed in a non-differential state in which the power distributing mechanism 16 is not operable to perform the differential function, when the switching brake B0 or switching clutch C0 is placed in its engaged state. Described in detail, when the switching clutch C0 is engaged for connection of the sun gear S0 and carrier CA0, the power distributing mechanism 16 is placed in a locked state in which the sun gear S0, carrier CA0 and ring gear R0 are rotated as a unit, that is, in the non-differential state in which the power distributing mechanism 16 is not operable to perform the differential function. In this case, the differential portion 11 is placed in the non-differential state, namely, in a fixed-speed-ratio shifting state or a step-variable shifting state in which the differential portion 11 (power distributing mechanism 16) functions as a transmission having a fixed speed ration of "1", with the rotating speed of the power transmitting member 18 being equal to the operating speed of the engine 8. When the switching brake B0 in place of the switching clutch C0 is engaged for fixing the sun gear S0 to the casing 12, the power distributing mechanism 16 is placed in a locked state in which the sun gear S0 is held stationary, that is, in a non-differential state in which the power distributing mechanism 16 is not operable to perform the differential function, so that the differential portion 11 is laced in the non-differential state. In this state, the rotating speed of the ring gear R0 is made higher than that of the carrier CA0, and the power distributing mechanism 16 functions as a speed-increasing mechanism, namely, the differential portion 11 (power distributing mechanism 16) is placed in a fixed-speed-ratio shifting state or step-variable shifting state in which the differential portion 11 functions as a speed-increasing mechanism having a fixed speed ratio smaller than "1", for example, a fixed speed ratio of about 0.7.

Where the differential portion 11 is provided with the switching brake B0 and the switching clutch C0 as described above, the output shaft 49 of the engine 49 can be rotated according to the engine control in the second embodiment, by placing the switching clutch C0 or brake B0 in its fully or partially engaged state to limit the differential function of the power distributing mechanism 16, rather than by controlling the first electric motor M1 to raise the engine speed $N_E$ (rotating speed of the output shaft 49). In this case, the operation of the first electric motor M1 is not essential to rotate the output shaft 49, and the transmission mechanism 10 need not be provided with the first electric motor M1, provided the transmission mechanism 10 is provided with at least one electric motor including the second electric motor M2. Thus, the output shaft 49 of the engine 8 can be rotated by fully or partially engaging the switching clutch C0 or switching brake B0, without operating the first electric motor. Where the torque to be transmitted from the drive wheels 34 toward the engine 8 is large enough to rotate the output shaft 49 in the engine control, the operation of the second electric motor M2 in the engine control may be unnecessary. It will be understood that the switching clutch C0 and switching brake B0 which can limit the differential function of the differential mechanism in the form of the power distributing mechanism 16 can be said to be a differential limiting device operable to limit the differential function of the differential mechanism.

In the second embodiment, the implementing order determining portion 102 functions as a step-variable shifting inhibiting portion or an engine operation inhibiting portion, and is configured to command the step-variable shifting control portion 82 to first implement the shifting control of the automatic transmission portion 20 and then command the engine control implementing portion 114 to implement the control of the engine 8 to rotate its output shaft 49, where the concurrent determining portion 90 determines that the engine control and the shifting control are concurrently required to be implemented. However, the implementing order determining portion 102 may be configured to command the engine control implementing portion 114 and the step-variable shifting control portion 82 to first implement one of the engine control and shifting control, the implementation of which is determined prior to the implementation of the other control. Where the determination to implement the engine control is made prior to the determination to implement the shifting control, for example, the implementing order determining portion 102 first commands the engine control implementing portion 114 to first implement the engine control, and then commands the step-variable shifting control portion 82 to implement the shifting control only after completion of the engine control. In this case, the shifting control is inhibited until the engine control is completed. This arrangement prevents concurrent implementation of the shifting control and the engine control, and accordingly prevents deterioration of the shifting shock and the shock due to the engine control.

In the second embodiment, the determination to implement the control of the engine 8 is made in step SC7 when at least one of the continuous running distance $T_M$, continuous running time $T_M$ and vehicle running speed V has exceeded the corresponding upper limit L1, T1, V1, that is, when the affirmative determination is obtained in at least one of steps SC3, SC4 and SC5. However, this arrangement is not essential. For instance, the engine control determining routine of FIG. 13 is modified such that the determination to implement the engine control is made when at least two of the continuous running distance $T_M$, continuous running time $T_M$ and vehicle running speed V have exceeded the corresponding upper limits L1, T1, V1.

What is claimed is:

1. An engine control apparatus for a vehicle provided with a drive system including an engine and a transmission portion which constitutes a part of a power transmitting path, said engine control apparatus comprising:
an engine control portion configured to change a timing of initiation of a control of the engine according to contents of a requirement for implementing the control of the engine, when the control of the engine and a shifting control of said transmission portion are concurrently required to be implemented.

2. The engine control apparatus according to claim 1, wherein the requirement for implementing the control of the engine is a requirement for implementing a starting control of said engine, and the contents of said requirement include presence or absence of a requirement for a change of a drive force to drive the vehicle, said engine control portion implements the starting control of the engine in the process of said shifting control of said transmission portion when the requirement for said change of the drive force is present, and initiates one of the starting control of the engine and the shifting control after completion of the other of the starting control and the shifting control, when the requirement for said change of the drive force is absent.

3. The engine control apparatus according to claim 2, wherein said engine control portion implements one of the shifting control and the engine starting control the implementation of which is determined prior to the other, such that said one of the shifting and engine starting controls is implemented prior to the other, when the requirement for the change of the drive force is absent.

4. The engine control apparatus according to claim 1, wherein said drive system further includes an electric motor operatively connected to a drive wheel of the vehicle, and said engine control portion is configured to implement the control to rotate an output shaft of said engine when a continuous running distance of the vehicle in a motor drive mode in which the vehicle runs with said electric motor while said engine is held at rest has exceeded a predetermined upper limit,
and wherein said engine control portion initiates one of the control of the engine to rotate its output shaft when the continuous running distance has exceeded the upper limit and said shifting control after completion of the other of the control of the engine and the shifting control, when said control of the engine to rotate its output shaft and the shifting control are concurrently required to be implemented.

5. The engine control apparatus according to claim 1, wherein said drive system further includes an electric motor operatively connected to a drive wheel of the vehicle, and said engine control portion is configured to implement the control to rotate an output shaft of said engine when a continuous running time of the vehicle in a motor drive mode in which the vehicle runs with said electric motor while said engine is held at rest has exceeded a predetermined upper limit,
and wherein said engine control portion initiates one of the control of the engine to rotate its output shaft when the continuous running time has exceeded the upper limit and said shifting control after completion of the other of the control of the engine and the shifting control, when said control of the engine to rotate its output shaft and the shifting control are concurrently required to be implemented.

6. The engine control apparatus according to claim 1, wherein said drive system further includes an electric motor operatively connected to a drive wheel of the vehicle, and said engine control portion is configured to implement the control to rotate an output shaft of said engine when a running speed of the vehicle in a motor drive mode in which the vehicle runs with said electric motor while said engine is held at rest has exceeded a predetermined upper limit,
and wherein said engine control portion initiates one of the control of the engine to rotate its output shaft when the running speed has exceeded the upper limit and said shifting control after completion of the other of the control of the engine and the shifting control, when said control of the engine to rotate its output shaft and the shifting control are concurrently required to be implemented.

7. The engine control apparatus according to claim 6, wherein said engine control portion initiates the control of the engine to rotate its output shaft after completion of the shifting control of the automatic transmission portion, when said continuous running distance has been exceeded the upper limit while said control of the engine to rotate its output shaft and the shifting control are concurrently required to be implemented.

8. The engine control apparatus according to claim 6, wherein said engine control portion initiates the control of the engine to rotate its output shaft after completion of the shifting control of the automatic transmission portion, when said continuous running time has exceeded the upper limit while said control of the engine to rotate its output shaft and the shifting control are concurrently required to be implemented.

9. The engine control apparatus according to claim 6, wherein said engine control portion initiates the control of the engine to rotate its output shaft after completion of the shifting control of the automatic transmission portion, when said running speed has exceeded the upper limit while said control of the engine to rotate its output shaft and the shifting control are concurrently required to be implemented.

10. The engine control apparatus according to claim 1, wherein said drive system comprises an electrically controlled differential portion including a differential mechanism, an electric motor connected to a rotary element of the differential mechanism, an input shaft and an output shaft, a differential state between rotating speeds of said input and output shafts being controlled by controlling an operating state of said electric motor.

11. The engine control apparatus according to claim 10, wherein said differential mechanism includes a planetary gear set having a rotary element connected to said engine, and another rotary element connected to said electric motor, and an operating speed of the engine is raised by the electric motor.

12. The engine control apparatus according to claim 1, wherein the requirement for implementing the control of the engine is a requirement for implementing a starting control of said engine, and the contents of said requirement include presence or absence of a requirement for a change of a drive force to drive the vehicle, the requirement for said change of the drive force is a requirement for acceleration of the vehicle.

13. The engine control apparatus according to claim 1, wherein the requirement for implementing the control of the engine is a requirement for implementing a starting control of said engine, and the contents of said requirement include presence or absence of a requirement for a change of a drive force to drive the vehicle, the requirement for said change of the drive force is a requirement for deceleration of the vehicle.

14. The engine control apparatus according to claim 13, wherein said engine control portion initiates a rotary motion of the engine for starting the engine when the requirement for deceleration of the vehicle is present.

15. The engine control apparatus according to claim 13, wherein the drive system includes a manually operable shifting device, and the requirement for deceleration of the vehicle is detected when the manually operable shifting device is operated by an operator of the vehicle, to shift down said transmission portion.

16. The engine control apparatus according to claim 13, wherein the drive system includes a braking operating member manually operable to brake the vehicle, and the requirement for deceleration of the vehicle is detected when the brake operating member is operated by an operator of the vehicle to brake the vehicle.

17. The engine control apparatus according to claim 13, wherein the drive system includes a towing switch which is turned on to change a control mode of the drive system when the vehicle tows another vehicle, and the requirement for deceleration of the vehicle is detected when the towing switch is turned on.

18. The engine control apparatus according to claim 1, wherein said engine control portion starts the engine at an earlier point of time when the requirement for implementing the control of the engine reflects an intention of an operator of the vehicle to change a drive force to drive the vehicle, than when said requirement does not reflect said intention of the operator and the engine is started after completion of said shifting control of the transmission portion, where the control of the engine and said shifting control are concurrently required to be implemented.

19. The engine control apparatus according to claim 1, wherein said engine control portion controls a rate of rise of an operating speed of the engine and/or a rate of rise of an operating speed of the engine, and/or a timing of ignition of the engine, such that the rate of rise of the operating speed and/or the rate of rise of the torque is/are higher, and/or the operating speed of the engine at which the engine is ignited is lower, when the requirement for implementing the control of the engine reflects an intention of an operator of the vehicle to change a drive force to drive the vehicle, than when said requirement does not reflects said intension of the operator and the engine is started after completion of said shifting control of the transmission portion, where the control of the engine and said shifting control are concurrently required to be implemented.

20. An engine control apparatus for a vehicle provided with a drive system including an engine and a transmission portion which constitutes a part of a power transmitting path, said engine control apparatus comprising:

an engine control portion configured to change a method of a control of the engine according to contents of a requirement for implementing the control of the engine, when the control of the engine and a shifting control of said transmission portion are concurrently required to be implemented.

21. The engine control apparatus according to claim 20, wherein the requirement for implementing the control of the engine is a requirement for implementing a starting control of said engine, and the contents of said requirement include presence or absence of a requirement for a change of a drive force to drive the vehicle, said engine control portion controls a rate of rise of an operating speed of the engine and/or a rate of rise of a torque of the engine such that the rate of rise of the operating speed of the engine and/or the rate of rise of the torque of the engine is/are higher when the requirement for said change of the drive force is present than when the requirement for said change is absent.

22. The engine control apparatus according to claim 21, wherein said engine control portion implements the control of the engine prior to completion of said shifting control of the transmission portion.

23. The engine control apparatus according to claim 21, wherein said engine control portion increases the rate of rise of the operating speed of the engine and/or the rate of rise of the torque of the engine, by advancing an ignition timing of the engine.

24. The engine control apparatus according to claim 21, wherein said engine control portion increases the rate of rise of the operating speed of the engine and/or the rate of rise of the torque of the engine, by increasing an intake air quantity of the engine.

25. The engine control apparatus according to claim 21, wherein the drive system includes an electric motor that can raise the operating speed of the engine, and said engine control portion increases the rate of rise of the operating speed of the engine and/or the rate of rise of the torque of the engine, by increasing a rate of rise of an operating speed of said electric motor.

26. The engine control apparatus according to claim 20, wherein said drive system comprises an electrically controlled differential portion including a differential mechanism, an electric motor connected to a rotary element (S1) of the differential mechanism, an input shaft and an output shaft, a differential state between rotating speeds of said input and output shafts being controlled by controlling an operating state of said electric motor.

27. The engine control apparatus according to claim 26, wherein said differential mechanism includes a planetary gear set having a rotary element connected to said engine, and another rotary element connected to said electric motor, and an operating speed of the engine is raised by the electric motor.

28. The engine control apparatus according to claim 20, wherein the requirement for implementing the control of the engine is a requirement for implementing a starting control of said engine, and the contents of said requirement include presence or absence of a requirement for a change of a drive force to drive the vehicle, the requirement for said change of the drive force is a requirement for acceleration of the vehicle.

29. The engine control apparatus according to claim 20, wherein the requirement for implementing the control of the engine is a requirement for implementing a starting control of said engine, and the contents of said requirement include presence or absence of a requirement for a change of a drive force to drive the vehicle, the requirement for said change of the drive force is a requirement for deceleration of the vehicle.

30. The engine control apparatus according to claim 29, wherein said engine control portion initiates a rotary motion of the engine for starting the engine when the requirement for deceleration of the vehicle is present.

31. The engine control apparatus according to claim 29, wherein the drive system includes a manually operable shifting device, and the requirement for deceleration of the vehicle is detected when the manually operable shifting device is operated by an operator of the vehicle, to shift down said transmission portion.

32. The engine control apparatus according to claim 29, wherein the drive system includes a braking operating member manually operable to brake the vehicle, and the requirement for deceleration of the vehicle is detected when the brake operating member is operated by an operator of the vehicle to brake the vehicle.

33. The engine control apparatus according to claim 29, wherein the drive system includes a towing switch which is turned on to change a control mode of the drive system when the vehicle tows another vehicle, and the requirement for deceleration of the vehicle is detected when the towing switch is turned on.

34. The engine control apparatus according to claim 20, wherein said engine control portion starts the engine at an earlier point of time when the requirement for implementing the control of the engine reflects an intention of an operator of the vehicle to change a drive force to drive the vehicle, than when said requirement does not reflect said intention of the operator and the engine is started after completion of said shifting control of the transmission portion, where the control of the engine and said shifting control are concurrently required to be implemented.

35. The engine control apparatus according to claim 20 wherein said engine control portion controls a rate of rise of an operating speed of the engine and/or a rate of rise of an operating speed of the engine, and/or a timing of ignition of the engine, such that the rate of rise of the operating speed and/or the rate of rise of the torque is/are higher, and/or the operating speed of the engine at which the engine is ignited is lower, when the requirement for implementing the control of the engine reflects an intention of an operator of the vehicle to change a drive force to drive the vehicle, than when said requirement does not reflects said intension of the operator and the engine is started after completion of said shifting control of the transmission portion, where the control of the engine and said shifting control are concurrently required to be implemented.

* * * * *